United States Patent
Shitamoto

(10) Patent No.: US 9,846,434 B2
(45) Date of Patent: Dec. 19, 2017

(54) AUTONOMOUS TRAVEL VEHICLE AND REPRODUCTION TRAVEL METHOD

(71) Applicant: MURATA MACHINERY, LTD., Kyoto-shi, Kyoto (JP)

(72) Inventor: Hideo Shitamoto, Kyoto (JP)

(73) Assignee: MURATA MACHINERY, LTD., Kyoto (JP)

(*) Notice: Subject to any disclaimer, the term of this patent is extended or adjusted under 35 U.S.C. 154(b) by 0 days.

(21) Appl. No.: 15/118,129

(22) PCT Filed: Feb. 6, 2015

(86) PCT No.: PCT/JP2015/053331
§ 371 (c)(1),
(2) Date: Aug. 11, 2016

(87) PCT Pub. No.: WO2015/125627
PCT Pub. Date: Aug. 27, 2015

(65) Prior Publication Data
US 2017/0168492 A1    Jun. 15, 2017

(30) Foreign Application Priority Data
Feb. 18, 2014 (JP) ................. 2014-028512

(51) Int. Cl.
*G05D 1/00* (2006.01)
*G01C 21/20* (2006.01)
(Continued)

(52) U.S. Cl.
CPC ........... *G05D 1/0223* (2013.01); *G01C 21/20* (2013.01); *G05D 1/0088* (2013.01);
(Continued)

(58) Field of Classification Search
CPC .... G05D 1/0088; G05D 1/223; G05D 1/0221; G01C 21/20
(Continued)

(56) References Cited

U.S. PATENT DOCUMENTS

2008/0027591 A1* 1/2008 Lenser ................. G05D 1/0274
701/2
2010/0106356 A1* 4/2010 Trepagnier ............ G01S 17/023
701/25
(Continued)

FOREIGN PATENT DOCUMENTS

| EP | 0 971 276 A1 | 1/2000 |
|---|---|---|
| JP | 08-326025 A | 12/1996 |
| JP | 4433618 B2 | 3/2010 |

OTHER PUBLICATIONS

English translation of Official Communication issued in corresponding International Application PCT/JP2015/053331, dated Aug. 23, 2016.
(Continued)

Primary Examiner — Yazan A Soofi
(74) Attorney, Agent, or Firm — Keating & Bennett, LLP

(57) ABSTRACT

An autonomous travel vehicle includes a traveler, a storage, an elapsed autonomous travel time counter, and a reproduction travel command calculator. The traveler travels according to a travel control command. The storage stores travel route data in which subgoal points and arrival times are associated with each other. In a reproduction travel mode, the elapsed autonomous travel time counter counts the elapsed autonomous travel time while adjusting progress of the elapsed autonomous travel time. In the reproduction travel mode, the reproduction travel command calculator calculates a reproduction travel control command at the elapsed autonomous travel time as the travel control command based on a subgoal point stored in the travel route data
(Continued)

in association with an arrival time immediately after an arrival time corresponding to the elapsed autonomous travel time.

9 Claims, 11 Drawing Sheets

(51) Int. Cl.
  *G05D 1/02* (2006.01)
  *G07C 5/04* (2006.01)
(52) U.S. Cl.
  CPC .............. *G05D 1/0221* (2013.01); *G07C 5/04* (2013.01); *G05D 2201/0203* (2013.01)
(58) Field of Classification Search
  USPC .......................................................... 701/25
  See application file for complete search history.

(56) References Cited

U.S. PATENT DOCUMENTS

| | | | |
|---|---|---|---|
| 2014/0277900 A1* | 9/2014 | Abhyanker | G01C 21/32 |
| | | | 701/25 |
| 2017/0060137 A1* | 3/2017 | Shitamoto | G05D 1/0016 |

OTHER PUBLICATIONS

Official Communication issued in International Patent Application No. PCT/JP2015/053331, dated Mar. 17, 2015.
Official Communication issued in corresponding European Patent Application 15752333.3, dated Aug. 23, 2017.

* cited by examiner

AUTONOMOUS TRAVEL VEHICLE AND REPRODUCTION TRAVEL METHOD

BACKGROUND OF THE INVENTION

1. Field of the Invention

The present invention relates to an autonomous travel vehicle that autonomously travels while reproducing a specified travel route.

2. Description of the Related Art

There are known travel vehicles and robots that autonomously travel while reproducing a travel route taught by an operator. For instance, JP-A-8-326025 discloses a cleaning robot, which includes a casing equipped with travel drive means for traveling on a floor surface, position detection means for detecting a position of the casing on the floor surface, cleaning means for cleaning the floor surface, operation receiving means for receiving operation input interfaces for the travel drive means and the cleaning means, storage means for storing a travel route based on positions detected by the position detection means in association with received content of the operation receiving means, and control means for reading stored content stored in the storage means so as to control the travel drive means and the cleaning means based on the stored content.

The travel vehicle or the robot described above reads position information stored in travel route data indicating a taught travel route every predetermined control period and autonomously travels based on the read position information, so as to perform reproduction travel along the taught travel route. When this travel vehicle or robot performs the reproduction travel along a travel route, it may change a travel condition such as an unexpected stop or deceleration due to an existence of an obstacle on the travel route (which did not exist when the travel route was taught, in particular).

The conventional travel vehicle or robot continues to read the travel route data even during the stop or the traveling at a decreased speed, and therefore an actual position of the travel vehicle or the robot may be deviated from the position information of the read travel route data after the travel condition is changed. In this case, the taught travel route cannot be reliably reproduced for traveling.

In addition, it is difficult for the conventional travel vehicle or robot to reliably reproduce a work having a concept of time, e.g., "to stop for a constant period of time" or "to do different works for different sections".

SUMMARY OF THE INVENTION

Preferred embodiments of the present invention provide autonomous travel vehicles that reliably reproduce a travel having a concept of time.

Hereinafter, a plurality of preferred embodiments of the present invention are described. These preferred embodiments can be arbitrarily combined as necessary or desired.

An autonomous travel vehicle according to a preferred embodiment of the present invention includes a traveler, a storage, an elapsed autonomous travel time counter, and a reproduction travel command calculator. The traveler travels in accordance with a travel control command. The storage stores travel route data. The travel route data includes a plurality of subgoal points and arrival times that are stored in association with each other. The subgoal points are target points on a planned travel route. The arrival times are time points for when the autonomous travel vehicle reaches each subgoal point.

When the reproduction travel mode is executed, the elapsed autonomous travel time counter adjusts the elapsed autonomous travel time. Specifically, the elapsed autonomous travel time counter counts the elapsed autonomous travel time while adjusting progress of the elapsed autonomous travel time based on a predetermined condition. The reproduction travel mode is a mode in which the autonomous travel vehicle autonomously travels based on the travel route data. The elapsed autonomous travel time is an elapsed time from the start of the reproduction travel mode.

When the reproduction travel mode is executed, the reproduction travel command calculator calculates a reproduction travel control command at the elapsed autonomous travel time as the travel control command, based on a subgoal point stored in the travel route data in association with a target arrival time. The target arrival time may be an arrival time immediately after the arrival time corresponding to the elapsed autonomous travel time in the travel route data.

In the autonomous travel vehicle described above, during traveling along the planned travel route based on the travel route data (namely, during execution of the reproduction travel mode), the elapsed autonomous travel time counter counts the elapsed autonomous travel time while adjusting the progress of the elapsed autonomous travel time based on a predetermined condition. In addition, during execution of the reproduction travel mode, the reproduction travel command calculator calculates the reproduction travel control command at the current elapsed autonomous travel time based on the subgoal point stored in the travel route data in association with the target arrival time. The reproduction travel control command is calculated as the travel control command, and hence the traveler allows the autonomous travel vehicle to travel based on the calculated reproduction travel control command.

In the autonomous travel vehicle described above, a progress speed of the elapsed autonomous travel time is able to be adjusted in accordance with a predetermined condition. In addition, the reproduction travel control command is calculated based on the subgoal point associated with the arrival time corresponding to a time point immediately after the elapsed autonomous travel time. In this way, the reproduction travel command calculator selects an appropriate subgoal point as a next arrival target point by comparing the counted elapsed autonomous travel time with the arrival times in the travel route data. As a result, the autonomous travel vehicle reliably performs the reproduction travel along the planned travel route.

In addition, the travel route data includes data on the subgoal points and the arrival times stored in association with each other. Accordingly, an operation having a concept of time such as stopping for a constant time is able to be included in the travel route data that is stored. Further, when the reproduction travel mode is executed, the autonomous travel vehicle reliably reproduces the travel route data. Thus, the travel route indicated in the travel route data is able to be reliably reproduced, so that the travel having a concept of time is able to be reliably reproduced.

The reproduction travel command calculator may calculate the reproduction travel control command when the elapsed autonomous travel time reaches the arrival time in the travel route data. In this way, the reproduction travel control command is updated at the time point corresponding to the arrival time indicated in the travel route data.

The autonomous travel vehicle may further include a detector and a reproduction travel speed adjuster. The detector detects a position of an obstacle that hinders the traveling of the autonomous travel vehicle. The reproduction travel speed adjuster adjusts a reproduction traveling speed of the traveler based on the position of the obstacle when the reproduction travel mode is executed. The reproduction traveling speed is a speed of the autonomous travel vehicle when the reproduction travel mode is executed.

In addition, the elapsed autonomous travel time counter adjusts the progress of the elapsed autonomous travel time based on the reproduction traveling speed adjusted by the reproduction travel speed adjuster.

In this way, when the reproduction travel mode is executed, if an obstacle is detected, the autonomous travel vehicle is able to travel along the travel route by adjusting the speed. In addition, by adjusting a unit elapsed time based on the reproduction traveling speed, the progress speed of the elapsed autonomous travel time is able to be changed based on the reproduction traveling speed when the reproduction traveling speed of the autonomous travel vehicle changes in a manner that is not indicated in the travel route data.

As a result, the reproduction travel command calculator is able to select an appropriate subgoal point as a next arrival target point by comparing the counted elapsed autonomous travel time with the arrival times in the travel route data.

When the reproduction travel speed adjuster sets the reproduction traveling speed to zero, the elapsed autonomous travel time counter may stop to count the elapsed autonomous travel time. In this way, when the autonomous travel vehicle stops (when the reproduction traveling speed=0) and then restarts traveling, a subgoal point different from the true arrival target point is difficult to read from the travel route data.

When the reproduction travel speed adjuster decreases the reproduction traveling speed, the elapsed autonomous travel time counter may make the progress of the elapsed autonomous travel time slower than the progress of real time. In this way, when the reproduction travel mode is executed, even if the autonomous travel vehicle decelerates unexpectedly, a subgoal point different from the original arrival target point is difficult to read from the travel route data.

The travel route data may store the speed of the traveler at each of the plurality of subgoal points in association with each of the plurality of subgoal points. In this way, the reproduction travel command calculator is able to calculate the reproduction travel control command based on the speed of the autonomous travel vehicle in association with each subgoal point indicated in the travel route data.

The autonomous travel vehicle may further include an elapsed teaching time counter, and a taught data generator. The elapsed teaching time counter counts an elapsed teaching time when a manual operation teaching mode is executed. The manual operation teaching mode is a mode in which the travel route data is taught by an operation by an operator. The elapsed teaching time is a time from start of the manual operation teaching mode.

The taught data generator generates the travel route data storing a taught subgoal point and the elapsed teaching time when the taught subgoal point is acquired. These two points may be associated with each other. The taught subgoal point indicates a position on the travel route that is passed by the autonomous travel vehicle operated by the operator.

In this way, an operation of the autonomous travel vehicle operated by the operator, which has a concept of time, is able to be stored as the travel route data.

The taught data generator may store a taught speed in association with the taught subgoal point in the travel route data. The taught speed is a speed of the traveler at the taught subgoal point. In this way, the taught data generator is able to store an actual speed of the autonomous travel vehicle when the travel route is taught in the travel route data.

A reproduction travel method according to another preferred embodiment of the present invention is a reproduction travel method of an autonomous travel vehicle including a traveler and a storage. The traveler travels in accordance with a travel control command. The storage stores travel route data. In the travel route data, a plurality of subgoal points on the planned travel route and arrival times when the autonomous travel vehicle reaches each of the subgoal points respectively are stored in association with each other.

The reproduction travel method includes counting elapsed autonomous travel time that is an elapsed time from the start of a reproduction travel mode in which the autonomous travel vehicle autonomously travels along the travel route based on the travel route data, while adjusting progress of the elapsed autonomous travel time based on a predetermined condition; calculating a reproduction travel control command at the elapsed autonomous travel time as the travel control command, based on a subgoal point stored in the travel route data in association with a target arrival time, which is an arrival time immediately after an arrival time corresponding to the elapsed autonomous travel time; and controlling the traveler based on the reproduction travel control command as the travel control command.

In the reproduction travel method described above, progress speed of the elapsed autonomous travel time is adjusted in accordance with a predetermined condition. In addition, the reproduction travel control command at present is calculated based on a subgoal point associated with an arrival time corresponding to a time point immediately after the elapsed autonomous travel time. In this way, an appropriate subgoal point is able to be selected as a next arrival target point by comparing the counted elapsed autonomous travel time with the arrival times in the travel route data. As a result, the autonomous travel vehicle is able to travel while reliably reproducing the planned travel route.

Autonomous travel vehicles according to preferred embodiments of the present invention are able to operate on concepts of time and planned travel routes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
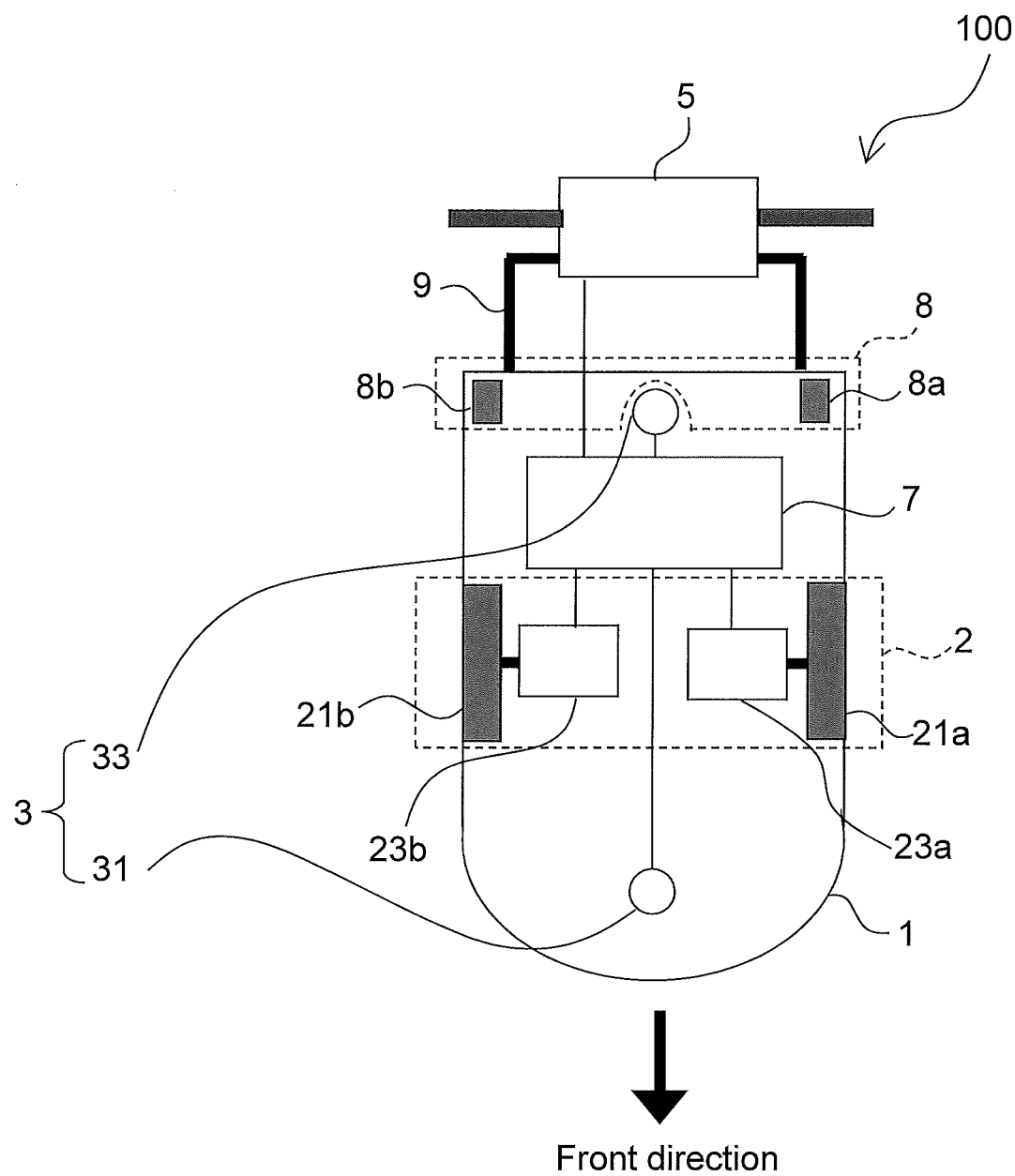
FIG. 1 is a diagram illustrating an overall structure of an autonomous travel vehicle.

First, an overall structure of an autonomous travel vehicle 100 according to the first preferred embodiment is described with reference to FIG. 1. FIG. 1 is a diagram illustrating an overall structure of the autonomous travel vehicle. The autonomous travel vehicle 100 includes a platform 1, a traveler 2, a detector 3, an operation input interface 5, and a controller 7. The platform 1 is a main body of the autonomous travel vehicle 100. The traveler 2 is provided on the platform 1. The traveler 2 allows the platform 1 to travel by travelling in accordance with a travel control command (described later). The detector 3 is connected to the controller 7 (described later) in a manner capable of transmitting and receiving signals. Further, the detector 3 detects an obstacle (a traveling obstacle such as a human or another vehicle, or a temporarily placed obstacle such as an article) and a wall or the like existed on the travel route, so as to output position information of the obstacle and the wall or the like to the controller 7. The operation input interface 5 is fixed to the upper rear side of the platform 1 via a connector 9. In addition, the operation input interface 5 is connected to the controller 7 in a manner capable of transmitting and receiving signals. The operation input interface 5 is operated by an operator when the operator teaches a travel route by operating the autonomous travel vehicle 100 to manually travel on a movement plane (when a manual operation teaching mode is executed). In this way, when a travel mode of the autonomous travel vehicle 100 is the manual operation teaching mode, the autonomous travel vehicle 100 is controlled based on the operation of the operation input interface 5 by the operator. In addition, the operation input interface 5 provides various settings of the autonomous travel vehicle 100.

The controller 7 is electrically connected to motors 23a and 23b (described later) of the traveler 2. In addition, the controller 7 is connected to the detector 3 in a manner capable of transmitting and receiving signals. When the manual operation teaching mode is executed, the controller 7 generates an operation travel control command as the travel control command based on the operation of the operation input interface 5 by the operator, and controls the motors 23a and 23b of the traveler 2.

On the other hand, when a reproduction travel mode is executed to travel autonomously along the travel route, the controller 7 generates a reproduction travel control command (described later) as the travel control command based on travel route data 500 (described later) indicating the travel route taught in the manual operation teaching mode, and controls the motors 23a and 23b of the traveler 2.

In addition, when the reproduction travel mode is executed, the controller 7 adjusts progress of the elapsed autonomous travel time based on a predetermined condition. Here, "progress of time" means a speed of time progress, for example. Accordingly, the progress of the elapsed autonomous travel time is not necessarily equal to real time (real time point). Further, the controller 7 of this preferred embodiment compares the adjusted elapsed autonomous travel time with arrival times (described later) indicated in the travel route data 500 so as to determine an arrival target point, and generates the reproduction travel control command based on the determined arrival target point.

Further, the controller 7 obtains position information of an obstacle, a wall, and the like based on a signal acquired from the detector 3 (described later). In addition, the controller 7 obtains a position of the autonomous travel vehicle 100 on the movement plane (travel environment) based on the position information of an obstacle, a wall, and the like. In addition, the controller 7 determines or identifies a traveling obstacle that hinders the traveling and a temporarily placed obstacle, which are on the travel route or are (estimated) to enter the travel route, based on the signal acquired from the detector 3. Further, if an unknown obstacle such as a traveling obstacle is detected when the reproduction travel mode is executed, a speed of the autonomous travel vehicle 100 during reproduction traveling (the reproduction traveling speed) is adjusted.

It should be noted that detailed structures of the traveler 2, the detector 3, the operation input interface 5, and the controller 7 of the autonomous travel vehicle 100 will be described later.

The autonomous travel vehicle 100 further includes an auxiliary wheel structure 8. The auxiliary wheel structure 8 includes two auxiliary wheels 8a and 8b. The two auxiliary wheels 8a and 8b are attached to the rear bottom of the platform 1 in a manner capable of independently rotating. By providing the auxiliary wheel structure 8, the autonomous traveling vehicle 100 is able to move stably and smoothly.

Next, a structure of the traveler 2 is described in detail with reference to FIG. 1. The traveler 2 includes two main wheels 21a and 21b, and two motors 23a and 23b. The main wheels 21a and 21b are disposed on the bottom substantially in the middle of the platform 1.

In addition, the main wheels 21a and 21b are each connected to output rotation shafts of the motors 23a and 23b, respectively. In this way, the main wheel 21a rotates in accordance with rotation of the motor 23a, and the main wheel 21b rotates in accordance with rotation of the motor 23b. In other words, the main wheel 21a and the main wheel 21b are able to be rotated independently of each other. Accordingly, by differentiating between a rotation speed of the main wheel 21a and a rotation speed of the main wheel 21b, a travel direction (orientation) of the platform 1 (the autonomous travel vehicle 100) is able to be changed.

The motors 23a and 23b are electrically connected to the controller 7. Each of the motors 23a and 23b is able to be controlled independently by a motor driver 75 (FIG. 3) of the controller 7. Accordingly, the motors 23a and 23b are able to be rotated independently and forwardly or reversely at arbitrary rotational speeds. As a result, rotational speeds of the main wheels 21a and 21b are able to be controlled independently.

As the motors 23a and 23b, an electric motor such as a servo motor and/or a brushless motor can be used.

Next, a structure of the detector 3 is described with reference to FIG. 1. The detector 3 detects an obstacle (such as a traveling obstacle) and a wall or the like around the travel route of the autonomous traveling vehicle 100, so as to output position information of an obstacle, a wall, or the like. For this purpose, the detector 3 includes a front detector 31 and a rear detector 33. The front detector 31 detects an obstacle, a wall, or the like in front of the autonomous traveling vehicle 100. The rear detector 33 detects an obstacle, a wall, or the like behind the autonomous traveling vehicle 100. In addition, the front detector 31 and the rear detector 33 outputs a signal including information about a distance between the autonomous travel vehicle 100 and the obstacle, the wall, or the like and a direction of the obstacle, the wall, or the like viewed from the autonomous travel vehicle 100. In this way, the detector 3 is able to output relative position information of the obstacle, the wall, or the like viewed from the autonomous traveling vehicle 100 to the controller 7.

As the front detector 31 and the rear detector 33 of the detector 3, a laser range finder (LRF) or the like having a detection range of at least 180 degrees and a detection distance of at least 4 meters can be used, for example.

Because the detection distance of the front detector 31 and the rear detector 33 is at least 4 meters, for example, an obstacle at a longer distance is able to be detected. In this way, the autonomous travel vehicle 100 is able to determine whether or not to decelerate or stop the autonomous travel vehicle 100 at an earlier stage.

Note that the detection distance described above is not limited to about 4 meters, and an appropriate detection distance can be selected in accordance with the traveling speed (maximum speed) or the like of the autonomous travel vehicle 100.

Figure 2:
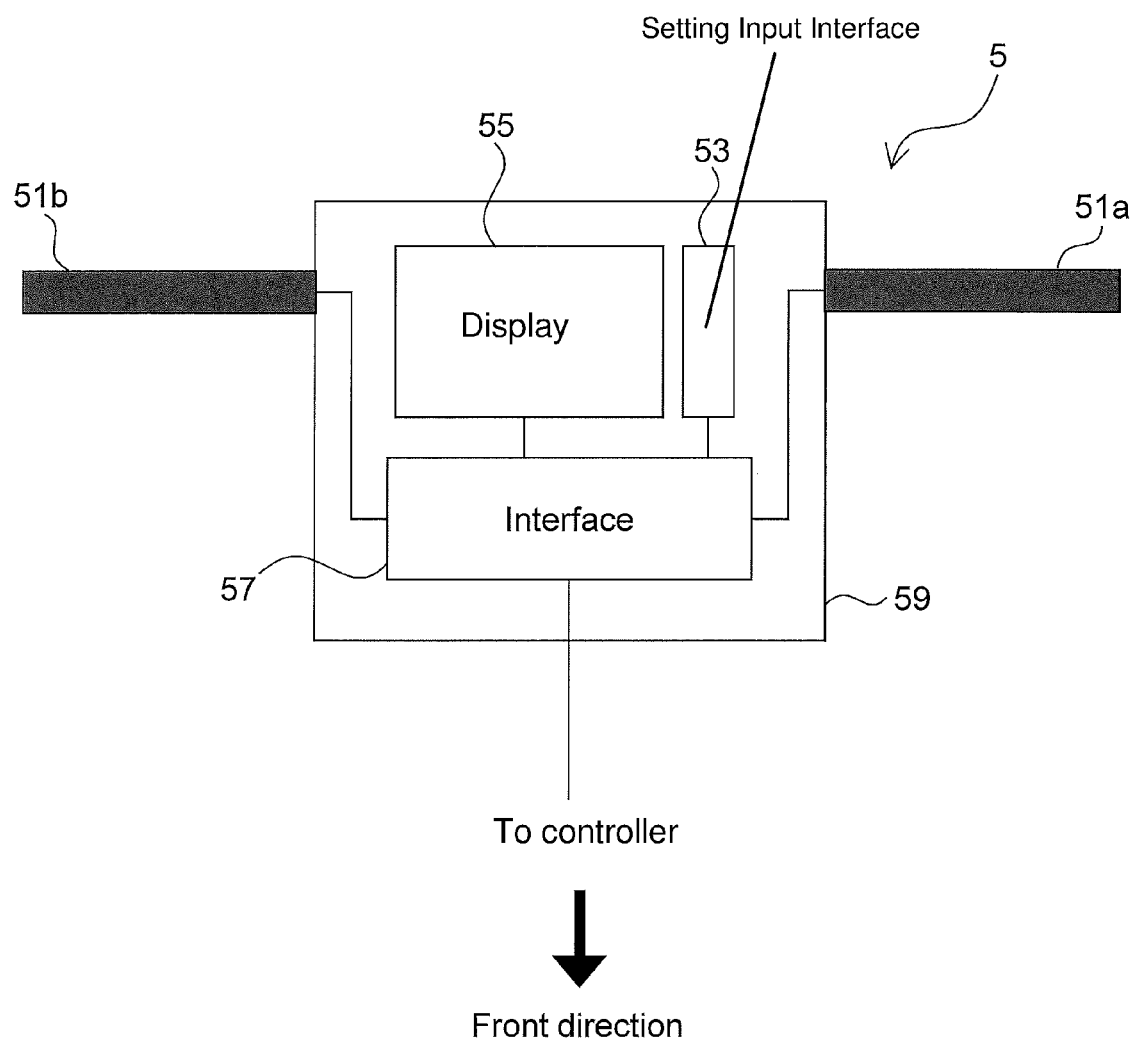
FIG. 2 is a diagram illustrating a structure of an operation input interface.

Next, a structure of the operation input interface 5 is described with reference to FIG. 2. FIG. 2 is a diagram illustrating a structure of the operation input interface 5. The operation input interface 5 includes operation handles 51*a* and 51*b*, a setting input interface 53, a display 55, an interface 57, and a casing 59.

The operation handles 51*a* and 51*b* are attached respectively to the left and right of the casing 59 in a rotatable manner. In addition, the operation handles 51*a* and 51*b* are connected to the interface 57 in a manner capable of transmitting and receiving signals. In this way, rotation amounts (operation amounts) and rotation directions of the operation handles 51*a* and 51*b* are converted into electric signals by the interface 57 and are input to the controller 7. Further, based on the rotation amounts and the rotation directions of the operation handles 51*a* and 51*b* input to the controller 7, the operation travel control command is generated, and the generated operation travel control command is used as the travel control command to control the motors 23*a* and 23*b* of the traveler 2.

In addition, the operation handle 51*a* may be an input interface that instructs a traveling speed in the traveling direction, while the operation handle 51*b* may be an input interface that instructs a steering angle.

In this way, when the manual operation teaching mode is executed, the operator operates the operation handles 51*a* and 51*b* so as to allow the autonomous traveling vehicle 100 to travel along a desired travel route.

The setting input interface 53 is connected to the interface 57. The setting input interface 53 switches the travel mode of the autonomous traveling vehicle 100 to either the reproduction travel mode or the manual operation teaching mode. Further, the travel mode set by the setting input interface 53 is input to a switch 77 (FIG. 3) of the controller 7 via the interface 57. In addition, the setting input interface 53 may be configured or programmed to make other various settings of the autonomous traveling vehicle 100.

The setting input interface 53 may preferably include, for example, switches and/or a keyboard that input or select various settings of the travel mode and the like of the autonomous traveling vehicle 100. Alternatively, the setting input interface 53 may preferably include a touch panel and may be integral with the display 55.

The display 55 is connected to the interface 57. The display 55 reads out and displays information such as various settings of the autonomous traveling vehicle 100 from the controller 7 via the interface 57. As the display 55, a display such as a liquid crystal display can be used, for example. In addition, if the setting input interface 53 and the display 55 are integral as described above, a display including a touch panel function can be used as the display 55 (and the setting input interface 53).

The interface 57 is connected to the controller 7. The interface 57 converts the rotation amounts and the rotation directions of the operation handles 51*a* and 51*b*, switch and/or key inputs of the setting input interface 53, and the like into electric signals and outputs the electric signals to the controller 7. In addition, the interface 57 reads out information about the autonomous traveling vehicle 100 from the controller 7 in accordance with an operator's instruction or the like, and displays the information on the display 55.

Accordingly, as the interface 57, a microcomputer, processor, or integrated circuit or circuits can be used, and can be configured or programmed to include, for example, a signal converter that converts the rotation amounts and the rotation directions of the operation handles 51*a* and 51*b* and a set state of the setting input interface 53 into electric signals, a display driving circuit that displays information on the display 55, and a communication interface that transmits and receives signals to and from the controller 7.

Figure 3:
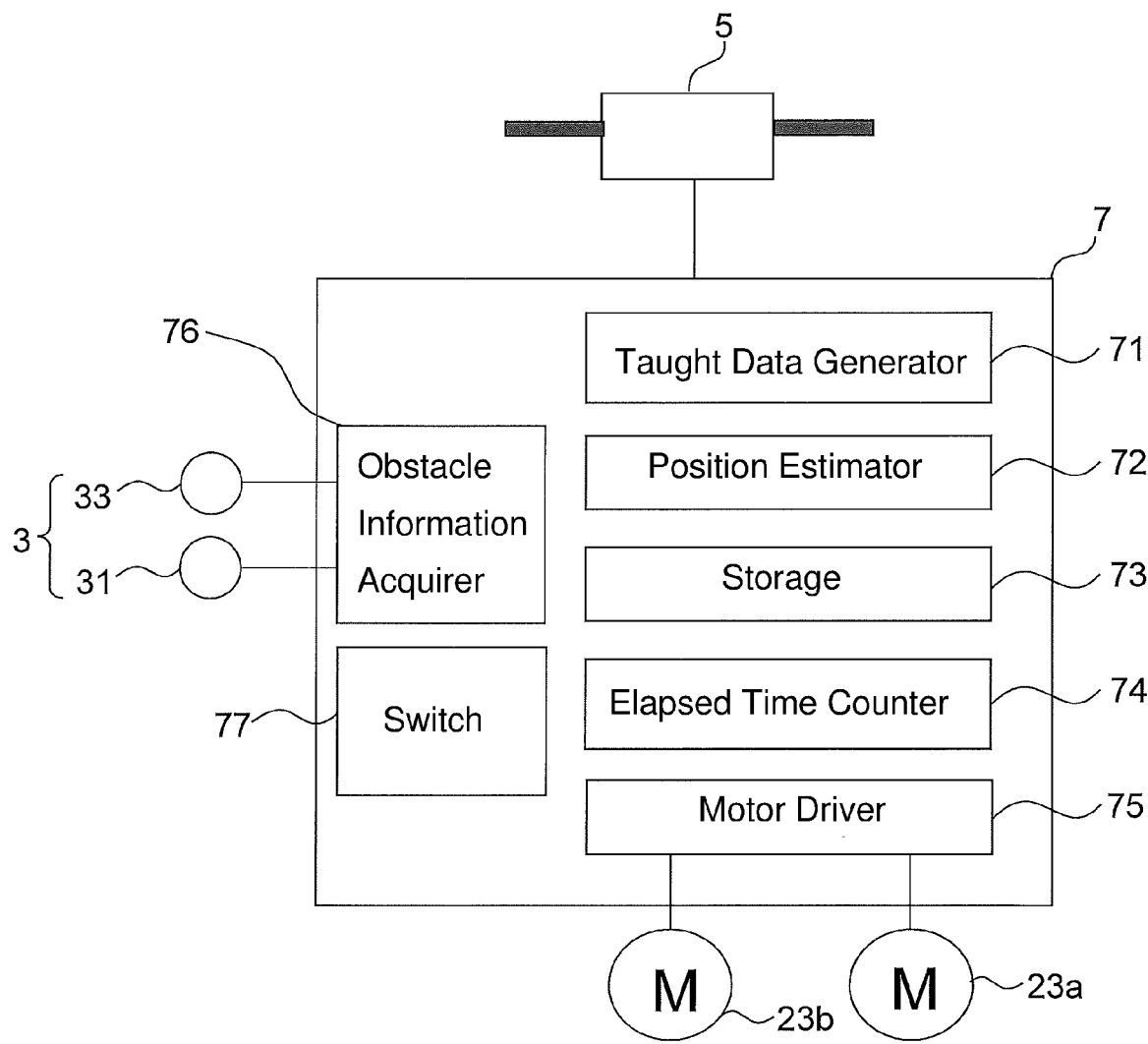
FIG. 3 is a diagram illustrating an overall structure of a controller.

Next, an overall structure of the controller 7 is described with reference to FIG. 3. FIG. 3 is a diagram illustrating an overall structure of the controller 7.

Note that the controller 7 can be realized using a computer such as a microcomputer system or the like, which includes a central processing unit (CPU), a storage device including a hard disk drive, a read only memory (ROM), a random access memory (RAM), a storage medium reading device, and the like, an interface that performs signal conversion, and the like.

In addition, some or all of the functions of the units or portions of the controller 7 described below may be realized as a program that can be executed by the computer such as the microcomputer system. Further, the program may be stored in the storage device of the microcomputer, processor, or integrated circuit or circuits. Alternatively, some or all of the functions of the units or portions of the controller 7 may be realized using a custom IC or the like.

The controller 7 is configured or programmed to include a taught data generator 71, a position estimator 72, a storage 73, an elapsed time counter 74, the motor driver 75, an obstacle information acquirer 76, and the switch 77.

The taught data generator 71 acquires, every predetermined time, information about positions through which the autonomous traveling vehicle 100 has passed when the operator operates the autonomous traveling vehicle 100 using the operation input interface 5, when the manual operation teaching mode is executed. Further, the taught data generator 71 converts the information about positions into coordinate values on a coordinate system expressing the movement plane on which the autonomous traveling vehicle 100 travels (hereinafter referred to as a movement coordinate system). Further, the taught data generator 71 stores in the storage 73 (described later) the information about positions after the coordinate conversion and the elapsed teaching times when the information about positions are acquired in association with each other.

Here, the information about positions described above indicates target points to be passed that are set on the planned travel route. Accordingly, the information about positions described above is referred to as a "taught subgoal point" or a "subgoal point".

In addition, when the manual operation teaching mode is executed, the taught data generator 71 continues to acquire the taught subgoal points from a travel start position of the autonomous travel vehicle 100 until the operator finishes the travel of the autonomous traveling vehicle 100 (until the end of the manual operation teaching mode or until reaching a travel end position). As a result, the taught data generator 71 is able to store an aggregate of the taught subgoal points acquired from the travel start position until the travel end position and an aggregate of the elapsed teaching times associated respectively with the taught subgoal points in the storage 73.

In this way, by acquiring and storing the positions through which the autonomous traveling vehicle 100 passes by the operation by the operator as an aggregate of coordinate values (the taught subgoal points) when the manual operation teaching mode is executed, the travel route of the autonomous travel vehicle 100 taught by the operation by the operator is able to be stored in the storage 73. The data including the aggregate of the taught subgoal points acquired by the taught data generator 71 and the aggregate of the elapsed teaching times associated respectively with the plurality of the taught subgoal points is referred to as "travel route data". In addition, the elapsed teaching time associated with each of the taught subgoal points is referred to as an "arrival time". Further, the taught subgoal point included in the stored travel route data 500 may be simply referred to as a "subgoal point".

In addition, because the travel route data 500 includes data stored in association with each other the information about positions through which the autonomous travel vehicle 100 passes when the manual operation teaching mode is executed (the taught subgoal points or the subgoal points) and the elapsed teaching times when the taught subgoal points are acquired (the arrival times), the travel route data 500 includes not only the information about positions but also the information about the time points.

As a result, when the taught travel route is reproduced in executing the reproduction travel mode, a reproduction travel command calculator 753 (FIG. 5) is able to appropriately select which taught subgoal point (the subgoal point) should be a next travel target subgoal point in the travel route data 500, while comparing the elapsed autonomous travel time (described later) with the arrival times in the travel route data 500.

In addition, when the taught data generator 71 acquires the taught subgoal point, it also acquires the speed (taught speed) of the autonomous travel vehicle 100 at the taught subgoal point, and stores the taught speed and the taught subgoal point in association with each other in the storage 73. In this case, the travel route data 500 includes the aggregate of the taught subgoal points (subgoal points), an aggregate of the arrival times, and an aggregate of the taught speeds.

In this way, by storing the (taught) speed at the (taught) subgoal point in association with the subgoal point in the travel route data 500, when the manual operation teaching mode is executed, an actual speed of the autonomous travel vehicle 100 in teaching the travel route is able to be stored as the travel route data 500. In addition, during the execution of the reproduction travel mode, the speed when passing through each subgoal point is retrieved from the travel route data 500.

In addition, by storing the (taught) speed at the (taught) subgoal point in association with the subgoal point in the travel route data 500, the travel route data 500 is able to store data of a travel having a concept of time such as stopping for a constant time, for example. Further, when the reproduction travel mode is executed, the autonomous travel vehicle 100 reliably reproduces this travel route data 500, and hence the travel having a concept of time is reliably reproduced while reliably reproducing the travel route indicated in the travel route data 500.

It should be noted that the taught speed as a speed of the autonomous travel vehicle 100 at the taught subgoal point described above is calculated based on the operation travel control command (described later) calculated from the rotation amounts and/or the rotation directions of the operation input interface 5, for example. Alternatively, the taught speed is able to be calculated from rotation amounts of the motors 23*a* and 23*b* or the main wheels 21*a* and 21*b* per unit time. Further, the taught speed may be calculated from a positional variation of the autonomous travel vehicle 100 per unit time estimated by the position estimator 72 (described later).

The position estimator 72 estimates a position of the platform 1 (the autonomous travel vehicle 100) in the travel environment (on the movement plane) every predetermined time. The position estimator 72 is able to estimate the position of the autonomous travel vehicle 100 on the movement plane by using, for example, a simultaneous localization and mapping (SLAM) method.

The position estimator 72 converts relative position information of an obstacle and/or a wall or the like viewed from the autonomous travel vehicle 100 acquired by the detector 3 into coordinate values on the movement coordinate system. Further, the position estimator 72 generates map information on the movement plane around the autonomous travel vehicle 100 (referred to as a local map) based on the position information of an obstacle and/or a wall or the like detected by the front detector 31 and the rear detector 33 of the detector 3. In addition, the position estimator 72 stores a map that represents the movement plane (referred to as an environment map) in the storage 73. Further, the position estimator 72 compares the environment map with the local map so as to estimate a position of the autonomous travel vehicle 100 on the movement plane.

In addition, the position estimator 72 is also configured or programmed to estimate a position of the autonomous travel vehicle 100 based on the rotational speeds of the motors 23*a* and 23*b* (dead reckoning). For this purpose, each of the output rotation shafts of the motors 23*a* and 23*b* is provided with a detector or meter that measures the rotational speed of the output rotation shaft. In this preferred embodiment, encoders 231*a* and 231*b* (FIG. 5) preferably are attached to the output rotation shafts of the motors 23*a* and 23*b*, respectively. In this way, by combining the position estimation by the detector 3 with the position estimation based on the rotational speeds of the motors 23*a* and 23*b*, these position estimation results are able to be complemented with each other. As a result, more accurate position estimation is achieved than the position estimation based on only the position information acquired by the detector 3 or only the rotational frequencies of the motors 23*a* and 23*b*.

In a case where the controller 7 is realized by the microcomputer system, the storage 73 corresponds to the storage device of the computer such as the microcomputer system (or a portion of a storage area of the storage device). The storage 73 stores information such as various settings of the autonomous travel vehicle 100, the travel route data 500, and the position information of an obstacle (such as a traveling obstacle), a wall, and the like. In addition, if some or all of the functions of the units or portions of the controller 7 is realized by a program or programs executable by the computer, the storage 73 may store this program or programs.

The elapsed time counter 74 counts various elapsed times used in the autonomous travel vehicle 100. In this preferred embodiment, there are the elapsed autonomous travel time (described later) and the elapsed teaching time as the elapsed times. The elapsed autonomous travel time is a time counted during the execution of the reproduction travel mode in the autonomous travel vehicle 100, and is an elapsed time from the start of the reproduction travel mode (from a time point when the execution of the reproduction travel mode is started). On the other hand, the elapsed teaching time is a time counted during the execution of the manual operation teaching mode in the autonomous travel vehicle 100, and is an elapsed time from the start of the manual operation teaching mode (from a time point when the execution of the manual operation teaching mode is started).

Note that a detailed structure and operation of the elapsed time counter 74 will be described later.

The motor driver 75 is connected to the motors 23a and 23b. In this way, the motor driver 75 controls the motors 23a and 23b.

The motor driver 75 is connected to the operation input interface 5 in a manner capable of transmitting and receiving signals. When the manual operation teaching mode is executed, the motor driver 75 generates the operation travel control command based on the rotation amounts and/or the rotation directions of the operation handles 51a and 51b of the operation input interface 5. Further, the motor driver 75 controls the motors 23a and 23b using the operation travel control command as the travel control command.

On the other hand, when the reproduction travel mode is executed, the motor driver 75 generates the reproduction travel control command based on the travel route data 500 stored in the storage 73. Further, the motor driver 75 controls the motors 23a and 23b using the reproduction travel control command as the travel control command.

Note that a detailed structure and operation of the motor driver 75 will be described later.

The obstacle information acquirer 76 is connected to the front detector 31 and the rear detector 33 of the detector 3 in a manner capable of transmitting and receiving signals. The obstacle information acquirer 76 acquires position information of an obstacle, a wall, and the like based on signals output from the front detector 31 and the rear detector 33. Further, the obstacle information acquirer 76 stores position information of an obstacle, a wall, and the like in the storage 73 as necessary. In this case, the obstacle information acquirer 76 may output the position information of an obstacle, a wall, and the like to the position estimator 72. Further, the position estimator 72 may convert the position information of an obstacle, a wall, and the like into coordinate values on the movement coordinate system and store the position information of an obstacle, a wall, and the like in the storage 73.

Figure 5:
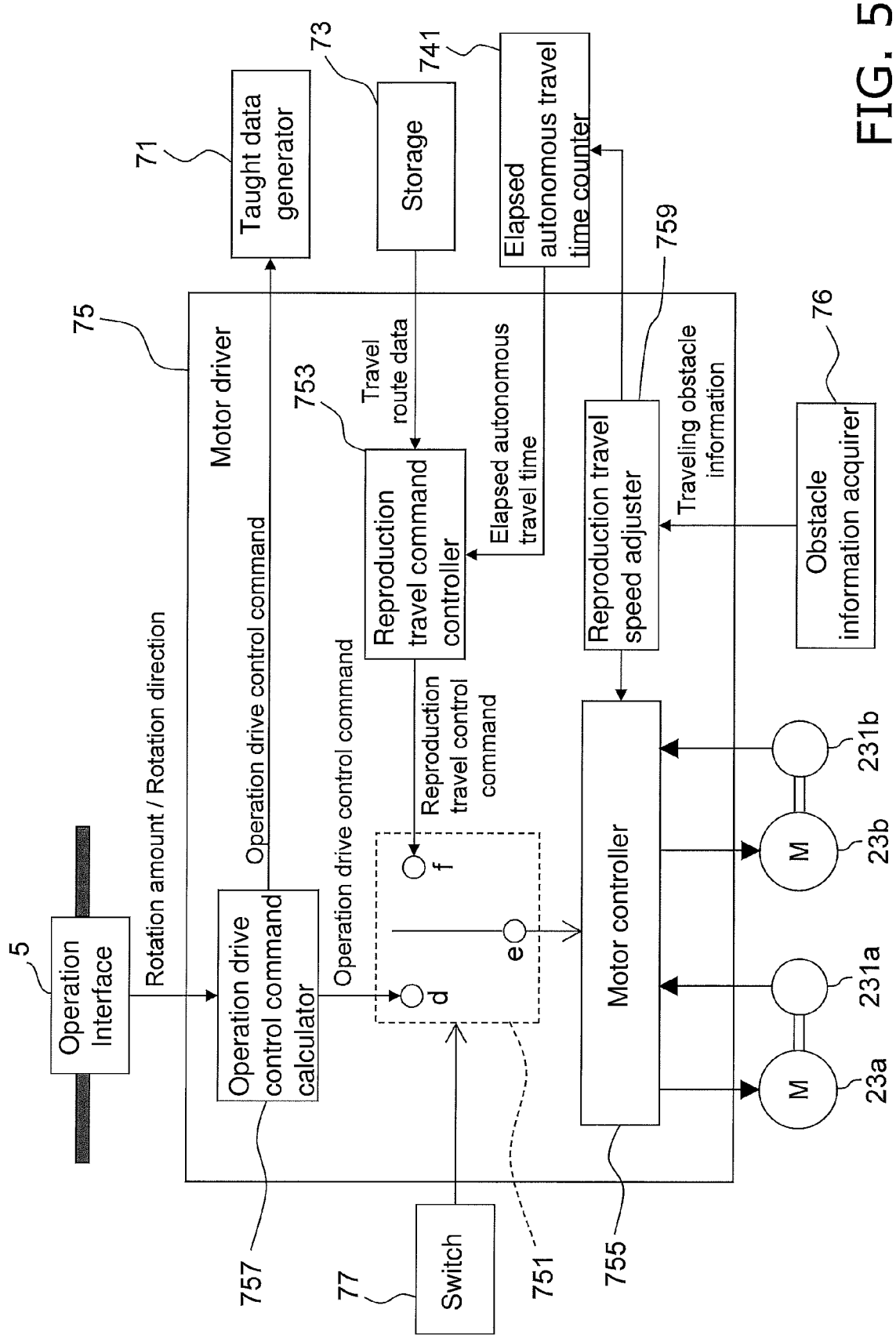
FIG. 5 is a diagram illustrating a structure of a motor driver.

In addition, the obstacle information acquirer 76 is able to transmit and receive signals to and from a reproduction travel speed adjuster 759 (FIG. 5). Accordingly, when the reproduction travel mode is executed, the obstacle information acquirer 76 is able to transmit the information about the position of the traveling obstacle that hinders the autonomous traveling to the reproduction travel speed adjuster 759.

The switch 77 switches and sets the travel mode of the autonomous travel vehicle 100 to either the reproduction travel mode or the manual operation teaching mode based on a set state of the travel mode in the setting input interface 53 of the operation input interface 5. Further, each functional unit or portion of the controller 7 is able to refer to the travel mode set by the switch 77 as necessary.

Figure 4:
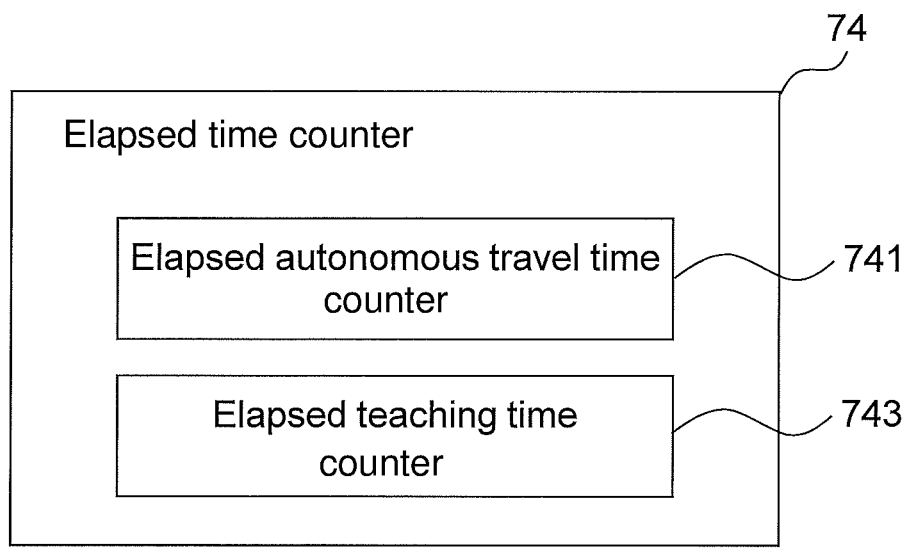
FIG. 4 is a diagram illustrating a structure of an elapsed time counter.

Next, a structure of the elapsed time counter 74 is described with reference to FIG. 4. FIG. 4 is a diagram illustrating a structure of the elapsed time counter. The elapsed time counter 74 includes an elapsed autonomous travel time counter 741 and an elapsed teaching time counter 743.

The elapsed autonomous travel time counter 741 counts the elapsed autonomous travel time when the reproduction travel mode is executed. The elapsed autonomous travel time counter 741 counts the elapsed autonomous travel time while adjusting the progress of the elapsed autonomous travel time based on a predetermined condition.

Specifically, during the execution of the reproduction travel mode, if a speed of the autonomous travel vehicle 100 (the reproduction traveling speed) becomes lower than the taught speed indicated in the travel route data 500, the elapsed autonomous travel time counter 741 delays the progress of the elapsed autonomous travel time with respect to the real time.

On the other hand, if the autonomous travel vehicle 100 executes stopping that is not indicated in the travel route data 500 during the execution of the reproduction travel mode, the elapsed autonomous travel time counter 741 stops counting the elapsed autonomous travel time.

In this way, since the elapsed autonomous travel time counter 741 adjusts the progress of the elapsed autonomous travel time based on a predetermined condition (such as unexpected deceleration, stop, or the like that is not indicated in the travel route data 500) when the reproduction travel mode is executed, the reproduction travel command calculator 753 is able to select an appropriate subgoal point as a next arrival target point by comparing the elapsed autonomous travel time with the arrival times in the travel route data 500. As a result, the autonomous travel vehicle 100 is able to travel while reliably reproducing the travel route indicated in the travel route data 500.

As described later, the elapsed autonomous travel time counter 741 adds and accumulates a unit elapsed time at each control timing described later so as to count the elapsed autonomous travel time. The unit elapsed time represents the time that determines the progress speed of the elapsed autonomous travel time. In this preferred embodiment, the unit elapsed time is adjusted based on the adjusted reproduction traveling speed.

The elapsed teaching time counter 743 counts the elapsed teaching time when the manual operation teaching mode is executed. The elapsed teaching time counter 743 counts the elapsed teaching time by, for example, adding and accumulating a predetermined unit time from the start of the manual operation teaching mode. As the predetermined unit time, a control period of the motors 23a and 23b in the motor driver 75 can be used, for example. Alternatively, it is possible to use a clock period of the computer system constituting the controller 7 or a time used in the computer system as the above unit time.

Next, a structure of the motor driver 75 is described with reference to FIG. 5. FIG. 5 is a diagram illustrating a structure of the motor driver.

The motor driver 75 includes a drive switch 751, the reproduction travel command calculator 753, a motor controller 755, an operation travel control command calculator 757, and the reproduction travel speed adjuster 759.

The drive switch 751 is connected to the switch 77 in a manner capable of transmitting and receiving signals. In addition, the drive switch 751 has three terminals d, e, and f. When the manual operation teaching mode is selected in the switch 77, the drive switch 751 connects the terminal d and the terminal e. In addition, when the reproduction travel mode is selected in the switch 77, the drive switch 751 connects the terminal e and the terminal f.

As a result, when the manual operation teaching mode is executed, the drive switch 751 inputs the operation travel control command to the motor controller 755 (described later). On the other hand, when the reproduction travel mode is executed, the drive switch 751 inputs the reproduction travel control command (described later) calculated by the reproduction travel command calculator 753 (described later) to the motor controller 755.

The reproduction travel command calculator 753 is connected to the storage 73 in a manner capable of transmitting and receiving signals. Accordingly, the reproduction travel command calculator 753 is able to refer to the travel route data 500 stored in the storage 73. In addition, the reproduction travel command calculator 753 is connected to the elapsed autonomous travel time counter 741 in a manner capable of transmitting and receiving signals. Accordingly, the reproduction travel command calculator 753 is able to refer to the elapsed autonomous travel time. Further, the reproduction travel command calculator 753 is connected to the terminal f of the drive switch 751.

Accordingly, when the reproduction travel mode is executed, the reproduction travel command calculator 753 compares the elapsed autonomous travel time with the arrival times in the travel route data 500, so as to set the arrival time immediately after the elapsed autonomous travel time as the target arrival time. Then, the reproduction travel command calculator 753 reads the subgoal point associated with the target arrival time (the arrival target point) from the travel route data 500, and calculates the reproduction travel control command based on the read subgoal point.

Further, when the reproduction travel mode is executed, because the terminal f is connected to the terminal e in the drive switch 751, the calculated reproduction travel control command is output to the motor controller 755. In this way, when the reproduction travel mode is executed, the motors 23a and 23b are controlled based on the reproduction travel control command calculated by the reproduction travel command calculator 753.

The motor controller 755 is electrically connected to the motors 23a and 23b. In addition, the motor controller 755 is connected to the encoders 231a and 231b provided to the motors 23a and 23b, respectively, in a manner capable of transmitting and receiving signals. Further, the motor controller 755 is connected to the terminal e of the drive switch 751.

Accordingly, when the manual operation teaching mode is executed, the motor controller 755 inputs the operation travel control command (described later) via the drive switch 751. On the other hand, when the reproduction travel mode is executed, the motor controller 755 inputs the reproduction travel control command via the drive switch 751.

Accordingly, when the manual operation teaching mode is executed, the motor controller 755 controls the motors 23a and 23b based on the operation travel control command. On the other hand, when the reproduction travel mode is executed, the motor controller 755 controls the motors 23a and 23b based on the reproduction travel control command.

In addition, when controlling the motors 23a and 23b, the motor controller 755 monitors the rotational speeds and the rotation amounts of the motors 23a and 23b measured by the encoders 231a and 231b. Further, the motor controller 755 feeds back the rotational speeds and the rotation amounts of the motors 23a and 23b so as to control the motors 23a and 23b (feedback control).

Accordingly, as the motor controller 755, a motor control device or the like, such as a processor, IC, or microcomputer, utilizing a feedback control theory may be used, for example.

The operation travel control command calculator 757 is connected to the operation input interface 5 in a manner capable of transmitting and receiving signals. Accordingly, the operation travel control command calculator 757 inputs the rotation amounts and/or the rotation directions of the operation handles 51a and 51b of the operation input interface 5. Further, the operation travel control command calculator 757 calculates the operation travel control command based on the rotation amounts and/or the rotation directions.

In addition, the operation travel control command calculator 757 is connected to the terminal d of the drive switch 751. Accordingly, when the manual operation teaching mode is executed (namely, when the terminal d is connected to the terminal e), the operation travel control command calculator 757 outputs the operation travel control command to the motor controller 755 via the drive switch 751.

Further, the operation travel control command calculator 757 is connected to the taught data generator 71 in a manner capable of transmitting and receiving signals. Accordingly, the operation travel control command calculator 757 is able to output the operation travel control command to the taught data generator 71 when the manual operation teaching mode is executed.

In this preferred embodiment, the operation travel control command is obtained by digitizing the rotation amounts and/or the rotation directions of the operation handles 51a and 51b. For instance, the operation travel control command can be a value corresponding to a ratio to the maximum rotation amount of the operation handle 51a or 51b with a positive or negative sign determined by the rotation direction of the operation handle 51a or 51b.

In this case, the motor controller 755 is able to determine the rotation speed of the motor 23a or 23b by multiplying the value indicated in the operation travel control command by the maximum rotation speed of the motor 23a or 23b determined in advance in the motor controller 755.

The reproduction travel speed adjuster 759 is connected to the obstacle information acquirer 76 in a manner capable of transmitting and receiving signals. Accordingly, when the reproduction travel mode is executed, the reproduction travel speed adjuster 759 is able to acquire information about a position of a traveling obstacle on the travel route that hinders the traveling and/or a traveling obstacle that exists around the travel route and may enter the travel route (traveling obstacle position information). In this way, when the reproduction travel mode is executed, the reproduction travel speed adjuster 759 is able to adjust a speed of the autonomous travel vehicle 100 (reproduction traveling speed) based on the position of the traveling obstacle (the traveling obstacle position information).

In addition, the reproduction travel speed adjuster 759 is connected to the motor controller 755 in a manner capable of transmitting and receiving signals. Accordingly, the reproduction travel speed adjuster 759 is able to output the adjusted reproduction traveling speed. In this case, the reproduction travel speed adjuster 759 is able to output an adjustment coefficient indicating a decreasing degree of the reproduction traveling speed when the reproduction traveling speed should be decreased, for example.

On the other hand, when the autonomous travel vehicle 100 should be stopped during the reproduction travel mode, the reproduction travel speed adjuster 759 is able to output, for example, a signal that sets the reproduction traveling speed or the adjustment coefficient to zero, to the motor controller 755.

Further, the reproduction travel speed adjuster 759 is connected to the elapsed autonomous travel time counter 741 in a manner capable of transmitting and receiving signals. Accordingly, the reproduction travel speed adjuster 759 is able to transmit the adjustment coefficient, indicating a decreasing degree of the reproduction traveling speed or an instruction to stop counting of the elapsed autonomous travel time, to the elapsed autonomous travel time counter 741.

In this way, when the reproduction traveling speed becomes lower than the taught speed stored in the travel route data 500, the elapsed autonomous travel time counter 741 is able to adjust a length of the unit elapsed time that is added and accumulated to the elapsed autonomous travel time by using the adjustment coefficient. In addition, when the autonomous travel vehicle 100 executes stopping that is not indicated in the travel route data 500, by receiving the instruction to stop counting the elapsed autonomous travel time, the elapsed autonomous travel time counter 741 is able to stop the counting.

Figure 6A:
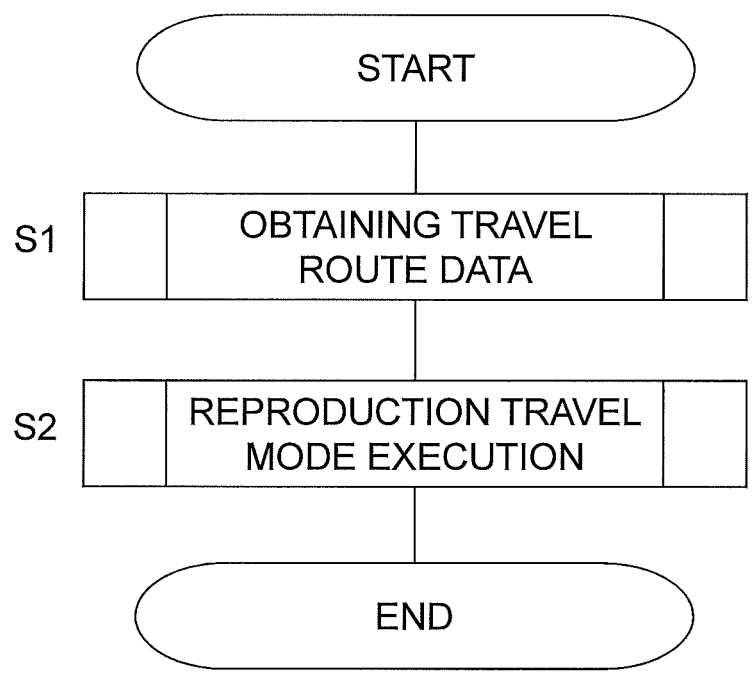
FIG. 6A is a flowchart illustrating a basic operation of the autonomous travel vehicle.

Next, a basic operation of the autonomous travel vehicle 100 according to this preferred embodiment is described with reference to FIG. 6A. FIG. 6A is a flowchart illustrating a basic operation of the autonomous travel vehicle. The example will be described in which the operator teaches the autonomous travelling vehicle 100 the travel route by operating the operation input interface 5 to move the autonomous travel vehicle 100, and then the autonomous travelling vehicle 100 reproduces the taught travel route when the reproduction travel mode is executed.

First, the travel route is taught to the autonomous travel vehicle 100. In other words, acquisition of the travel route data 500 is executed. When generation of the travel route data 500 starts, the taught data generator 71 obtains the travel route data 500 of the travel route along which the autonomous travel vehicle 100 passes when the operator operates the autonomous travel vehicle 100, and stores the ravel route data 500 in the storage 73 (Step S1).

In this preferred embodiment, the travel route data 500 includes not only the taught subgoal points indicating positions on the travel route through which the autonomous travel vehicle 100 passes, but also the elapsed teaching times when the taught subgoal points are obtained (the arrival times) and the speeds of the autonomous travel vehicle 100 (taught speeds) at the taught subgoal points in association with the taught subgoal points (subgoal points). Here, the arrival time is continuously counted without stopping from the start time point of the teaching.

In this way, when the reproduction travel mode is executed, the reproduction travel command calculator 753 is able to appropriately determine a subgoal point to be the next arrival target point by comparing the elapsed autonomous travel time with the arrival times in the travel route data 500. As a result, when the reproduction travel mode is executed, the autonomous travel vehicle 100 is able to reliably reproduce the travel route indicated in the travel route data 500.

The method of obtaining the travel route data 500 in Step S1 will be described later in detail.

After obtaining the travel route data 500, in order to allow the autonomous travel vehicle 100 to autonomously travel, the travel mode of the autonomous travel vehicle 100 is switched to the reproduction travel mode by using the setting input interface 53 or the like. Then, the autonomous travel vehicle 100 autonomously reproduces the travel route indicated in the travel route data 500 (Step S2).

When the autonomous travel vehicle 100 autonomously reproduces the travel route indicated in the travel route data 500, it uses the detector 3 to obtain the information about a position of a traveling obstacle that is supposed to exist on the travel route or enter the travel route, and hinders the travelling. Further, the autonomous travel vehicle 100 adjusts a speed during the reproduction travel (the reproduction traveling speed) based on the information about the position of the traveling obstacle.

For instance, if a distance between the traveling obstacle or the like and the autonomous travel vehicle 100 is sufficiently large, the reproduction travel speed adjuster 759 of the autonomous travel vehicle 100 decreases the reproduction traveling speed to be lower than the taught speed indicated in the travel route data 500 in order to wait for the traveling obstacle to move away from the travel route or other purpose. On the other hand, if the distance between the traveling obstacle and the autonomous travel vehicle 100 is small, the reproduction travel speed adjuster 759 sets the reproduction traveling speed to zero in order to avoid a collision between the traveling obstacle and the autonomous travel vehicle 100.

Further, when the reproduction travel mode is executed, the elapsed autonomous travel time counter 741 of this preferred embodiment adjusts the progress speed of the elapsed autonomous travel time based on the adjusted reproduction traveling speed. For instance, if a traveling obstacle is detected and the reproduction traveling speed is decreased to be lower than the taught speed as described above, the progress of the elapsed autonomous travel time is lowered.

On the other hand, if the reproduction traveling speed becomes zero (namely, if the autonomous travel vehicle 100 is stopped), counting (progress) of the elapsed autonomous travel time is stopped.

In this way, by adjusting the progress speed of the elapsed autonomous travel time in accordance with the reproduction traveling speed, when an unexpected change (adjustment) of the reproduction traveling speed that is not indicated in the travel route data 500 occurs in the autonomous travel vehicle 100 when the reproduction travel mode is executed, the reproduction travel command calculator 753 is able to appropriately determine a subgoal point to be the next arrival target point by comparing the elapsed autonomous travel time with the arrival times. As a result, when the reproduction travel mode is executed, the autonomous travel vehicle 100 is able to reliably reproduce the travel route indicated in the travel route data 500.

The reproduction travel method of the autonomous travel vehicle 100 in Step S2 will be described later in detail.

Figure 6B:
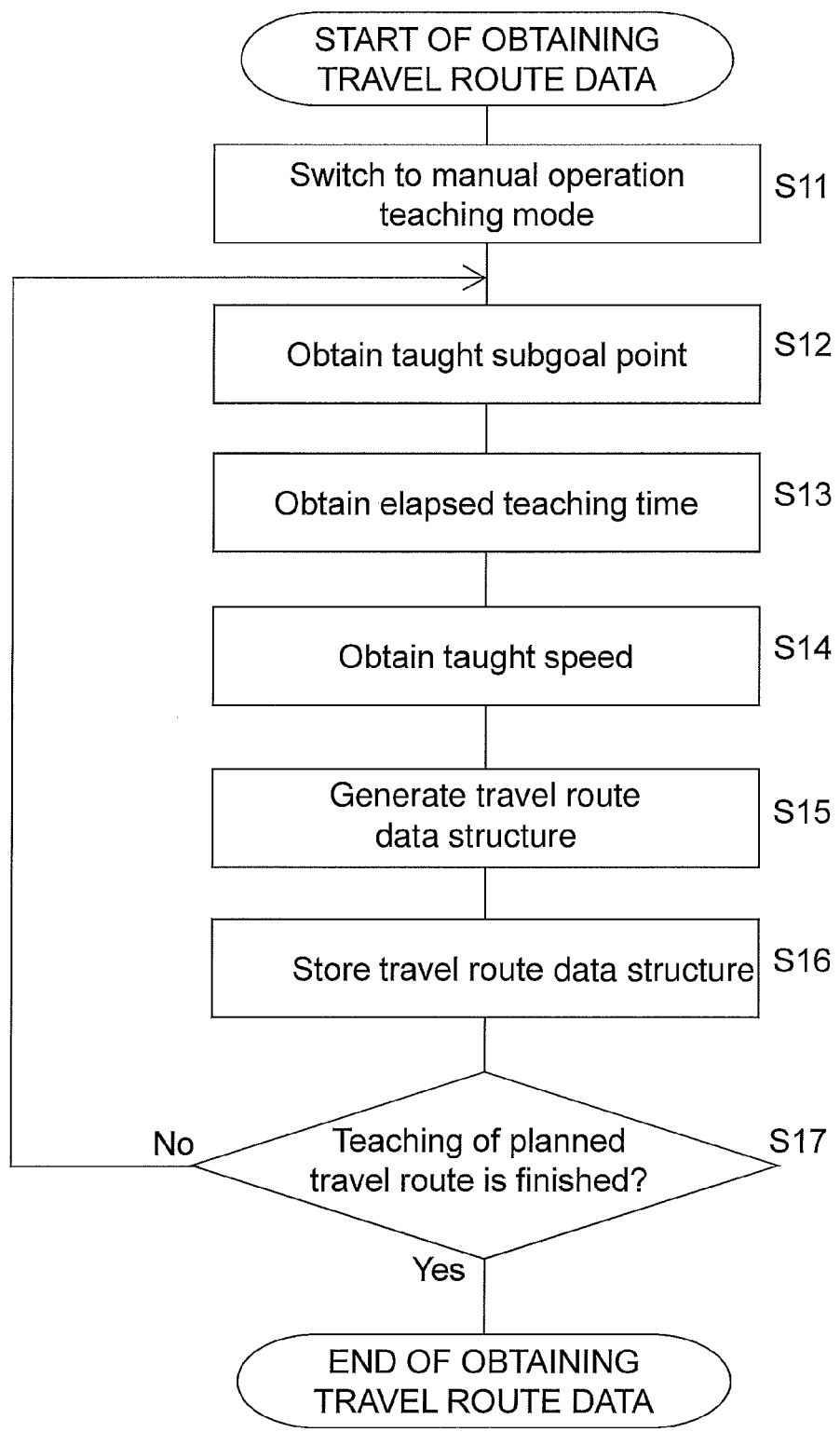
FIG. 6B is a flowchart illustrating a method of acquiring travel route data.

First, the method of obtaining the travel route data 500 in Step S1 of FIG. 6A is described with reference to FIG. 6B. FIG. 6B is a flowchart illustrating the method of obtaining the travel route data. In the example described here, the travel route data 500 is obtained in such a way that the operator operates the operation input interface 5 to move the autonomous travel vehicle 100 to teach the autonomous travel vehicle 100 the travel route, as described above.

Accordingly, the travel mode of the autonomous travel vehicle 100 is first set to the manual operation teaching mode (Step S11). The travel mode is switched to the manual operation teaching mode by the operator who operates the setting input interface 53 of the operation input interface 5, for example.

When the travel mode is switched to the manual operation teaching mode by the setting input interface 53, the switch 77 of the controller 7 is informed that the travel mode has become the manual operation teaching mode. Then, the switch 77 instructs the drive switch 751 of the motor driver 75 to connect the terminal d to the terminal e of the drive switch 751. In this way, the operation travel control command calculated based on the rotation amounts and the rotation directions of the operation handles 51a and 51b of the operation input interface 5 is input to the motor controller 755.

In this way, the operator is able to manually operate the autonomous travel vehicle 100 by adjusting the rotation amounts and the rotation directions of the operation handles 51a and 51b.

In addition, the elapsed teaching time counter 743 starts counting the elapsed teaching time at the timing when the travel mode is set to the manual operation teaching mode. In this preferred embodiment, the elapsed teaching time counter 743 counts the elapsed teaching time by accumulating the control period of the motors 23a and 23b as the unit time from start of the manual operation teaching mode.

After setting the travel mode to the manual operation teaching mode, the operator manually operates the autonomous travel vehicle 100. During the manual operation by the operator, the taught data generator 71 obtains a position on the movement plane through which the autonomous travel vehicle 100 passes by the operation by the operator as the taught subgoal point every predetermined time (Step S12). Alternatively, during the manual operation by the operator, the taught data generator 71 may obtain a position on the movement plane and the arrival time as the taught subgoal point every predetermined distance of travel.

In this case, it is preferable that the predetermined time to obtain the taught subgoal point is a multiple of a period of the control timing. In this way, a difference between the taught elapsed teaching time and the elapsed autonomous travel time during the reproduction travel can be zero.

When obtaining the subgoal point, the taught data generator 71 instructs the position estimator 72 to estimate a current position of the autonomous travel vehicle 100 on the movement coordinate system (coordinates of the subgoal point). Then, the position estimator 72 outputs, as the response of this instruction, the position expressed by the coordinate values (the subgoal point) as the taught subgoal point to the taught data generator 71.

After obtaining the taught subgoal point, the taught data generator 71 obtains from the elapsed teaching time counter 743 the elapsed teaching time when the taught subgoal point is obtained (Step S13).

Further, the taught data generator 71 obtains the speed of the autonomous travel vehicle 100 when passing through the obtained subgoal point as the taught speed (Step S14).

In this case, the taught data generator 71 receives from the operation travel control command calculator 757 the operation travel control command calculated by the operation travel control command calculator 757 from the rotation amounts and the rotation directions of the operation input interface 5 by the operation by the operator. Then, the taught data generator 71 acquires the received operation travel control command as the taught speed.

Alternatively, the taught data generator 71 may calculate the taught speed from the rotation amounts of the motors 23a and 23b or the main wheels 21a and 21b per unit time. Further, the taught data generator 71 may calculate the taught speed from the positional variation of the autonomous travel vehicle 100 per unit time estimated by the position estimator 72. The taught data generator 71 is able to appropriately obtain the taught speed by an appropriate method.

In this way, the reproduction travel command calculator 753 is able to calculate the reproduction travel control command based on the taught speed associated with each subgoal point indicated in the travel route data 500, as described later.

Figure 7A:
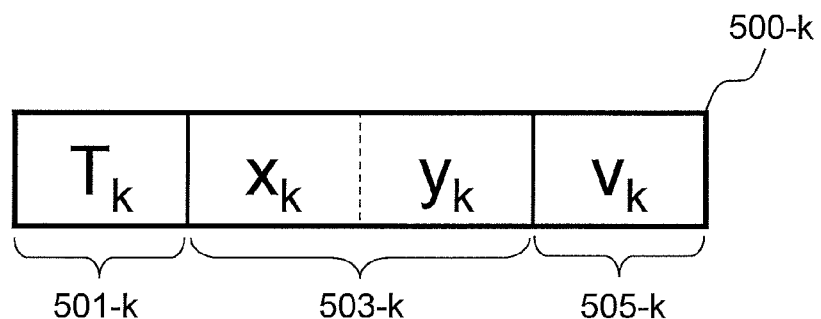
FIG. 7A is a diagram illustrating an example of a travel route data structure.

After executing Steps S12 to S14 described above to obtain the taught subgoal point, the elapsed teaching time when the taught subgoal point is obtained, and the taught speed when the taught subgoal point is obtained, the taught data generator 71 generates a travel route data structure 500-$k$ as illustrated in FIG. 7A, by associating the taught subgoal point, the elapsed teaching time, and the taught speed with each other (Step S15). FIG. 7A is a diagram illustrating an example of the travel route data structure.

The travel route data structure 500-$k$ illustrated in FIG. 7A is a travel route data structure generated with respect to the k-th acquired taught subgoal point. As illustrated in FIG. 7A, the travel route data structure 500-$k$ includes an arrival time storage area 501-$k$, a subgoal point storage area 503-$k$, and a taught speed storage area 505-$k$. In this travel route data structure 500-$k$, the arrival time storage area 501-$k$, the subgoal point storage area 503-$k$, and the taught speed storage area 505-$k$ are linked in the lateral direction of the paper plane.

The arrival time storage area 501-$k$ of the travel route data structure 500-$k$ stores the elapsed teaching time when the k-th taught subgoal point is obtained, as the arrival time ($T_k$). The subgoal point storage area 503-$k$ stores the coordinate values ($x_k$, $y_k$) of the k-th acquired taught subgoal point. Further, the taught speed storage area 505-$k$ stores the taught speed ($v_k$) at the k-th taught subgoal point ($x_k$, $y_k$).

By storing the taught subgoal point, the elapsed teaching time (the arrival time), and the taught speed in the travel route data structure 500-$k$ illustrated in FIG. 7A stores, the arrival time and the taught speed is able to be stored in association with the taught subgoal point.

After generating the travel route data structure 500-$k$, the taught data generator 71 stores the travel route data structure 500-$k$ in the storage 73 (Step S16).

When the subgoal point is stored in the storage 73, if some travel route data are already stored in the storage 73 and the travel route data 500 (FIG. 7B) is provided, the travel route data structure 500-$k$ generated this time is added to the end of the stored travel route data 500.

After storing the travel route data structure 500-$k$ in the storage 73, the taught data generator 71 checks whether or not the teaching of the travel route by the operator's manual operation is finished until the next taught subgoal point is obtained (Step S17). Here, the determination whether or not the teaching of the travel route is finished may be notified in such a way that the operator operates a switch or icon (not shown in the figures) that is disposed in the operation input interface 5 and notifies the taught data generator 71 that the teaching of the travel route is finished, for example.

Alternatively, the taught data generator 71 may determine that teaching of the travel route is finished when the rotation amounts of the operation handles 51a and 51b are zero (indicating no operation) for a preset constant time. Moreover, it is possible to determine whether or not the teaching of the travel route is finished in other ways to detect that the operator has finished the operation of the autonomous travel vehicle 100.

When it is determined that the teaching of the travel route by the operator's manual operation is finished ("Yes" in Step S17), the taught data generator 71 finishes obtaining the travel route data 500.

On the other hand, if it is determined that the teaching of the travel route by the operator's manual operation continues ("No" in Step S17), the process returns to Step S12, and the generation and storing of the travel route data structure 500-$k$ are continued. In this way, the taught data generator 71 is able to continue the generation and storing of the travel route data structure 500-$k$ as long as the teaching of the travel route continues (namely, as long as the manual operation teaching mode is executed).

Figure 7B:
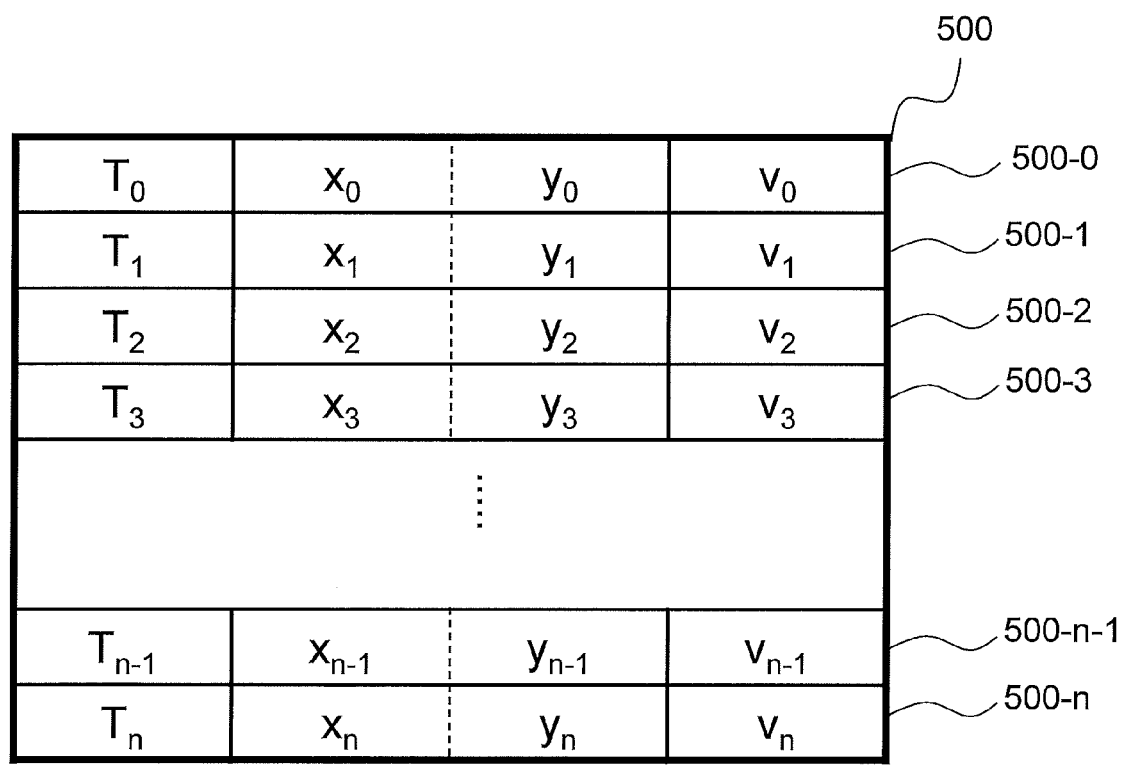
FIG. 7B is a diagram illustrating an example of the travel route data structure.

For instance, if the generation and storing of the travel route data structure 500-$k$ continues until n+1 taught subgoal points are obtained, the travel route data 500 as illustrated in FIG. 7B is obtained. FIG. 7B is a diagram illustrating an example of the travel route data.

In the travel route data 500 illustrated in FIG. 7B, n+1 travel route data units 500-0, 500-1, 500-2, 500-3, ..., 500-$n$-1, and 500-$n$ are connected to stack from up to down on the paper plane. In other words, the travel route data 500 illustrated in FIG. 7B includes of n+1 travel route data structures.

In this way, by executing Steps S11 to S17 described above, the taught data generator 71 is able to generate the travel route data 500 as illustrated in FIG. 7B, which stores the taught subgoal points, the arrival times when the taught subgoal points are obtained, and the taught speeds at the taught subgoal points in association with each other.

Figure 8:
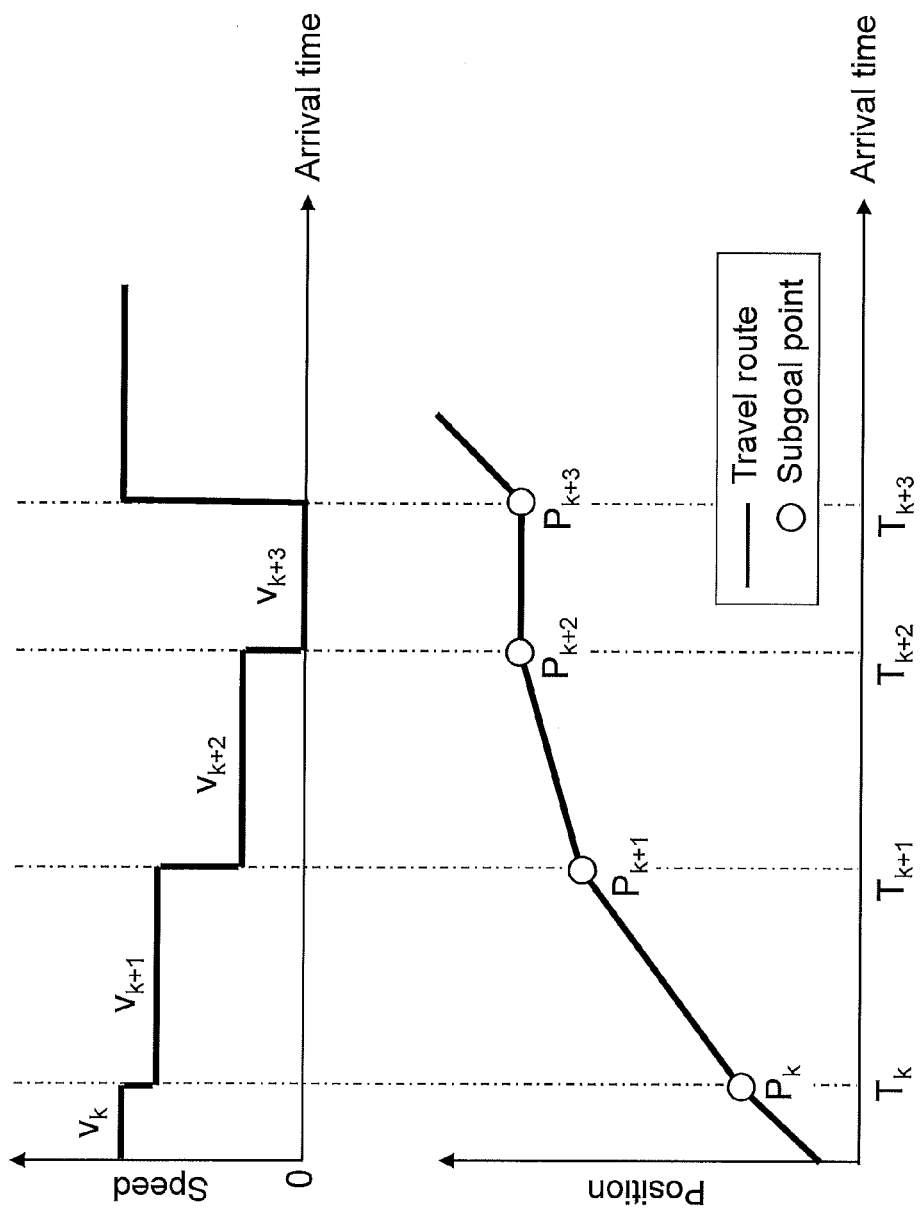
FIG. 8 is a diagram schematically illustrating a relationship among a subgoal point indicated in the travel route data, a speed associated with the subgoal point, and an arrival time.

Next, a principle of the reproduction travel indicated in the travel route data 500 of the autonomous travel vehicle 100 of this preferred embodiment is described. Here, an example of the reproduction travel from the k-th to the (k+3)th of the travel route data 500 as illustrated in FIG. 8 is described. FIG. 8 is a diagram schematically illustrating a relationship among the subgoal point, the speed associated with the subgoal point, and the arrival time indicated in the travel route data 500.

As illustrated in FIG. 8, it is supposed that the arrival times $T_k$, $T_{k+1}$, $T_{k+2}$, and $T_{k+3}$ and the taught speeds $v_k$, $v_{k+1}$, $v_{k+2}$, and $v_{k+3}$ are respectively associated with the k-th to the (k+3)th subgoal points $P_k$, $P_{k+1}$, $P_{k+2}$, and $P_{k+3}$ of the travel route data 500. As a result, it is supposed that the travel route is taught such as broken line illustrated by a solid line in a graph of FIG. 8 indicating a relationship between the positions and the arrival times.

As illustrated in FIG. 8, because the subgoal points and the arrival times are associated with each other in the travel route data 500, an operation having a concept of time such as stopping from the arrival time $T_{k+2}$ to the arrival time $T_{k+3}$, for example, is able to be stored in the travel route data 500.

Figure 9:
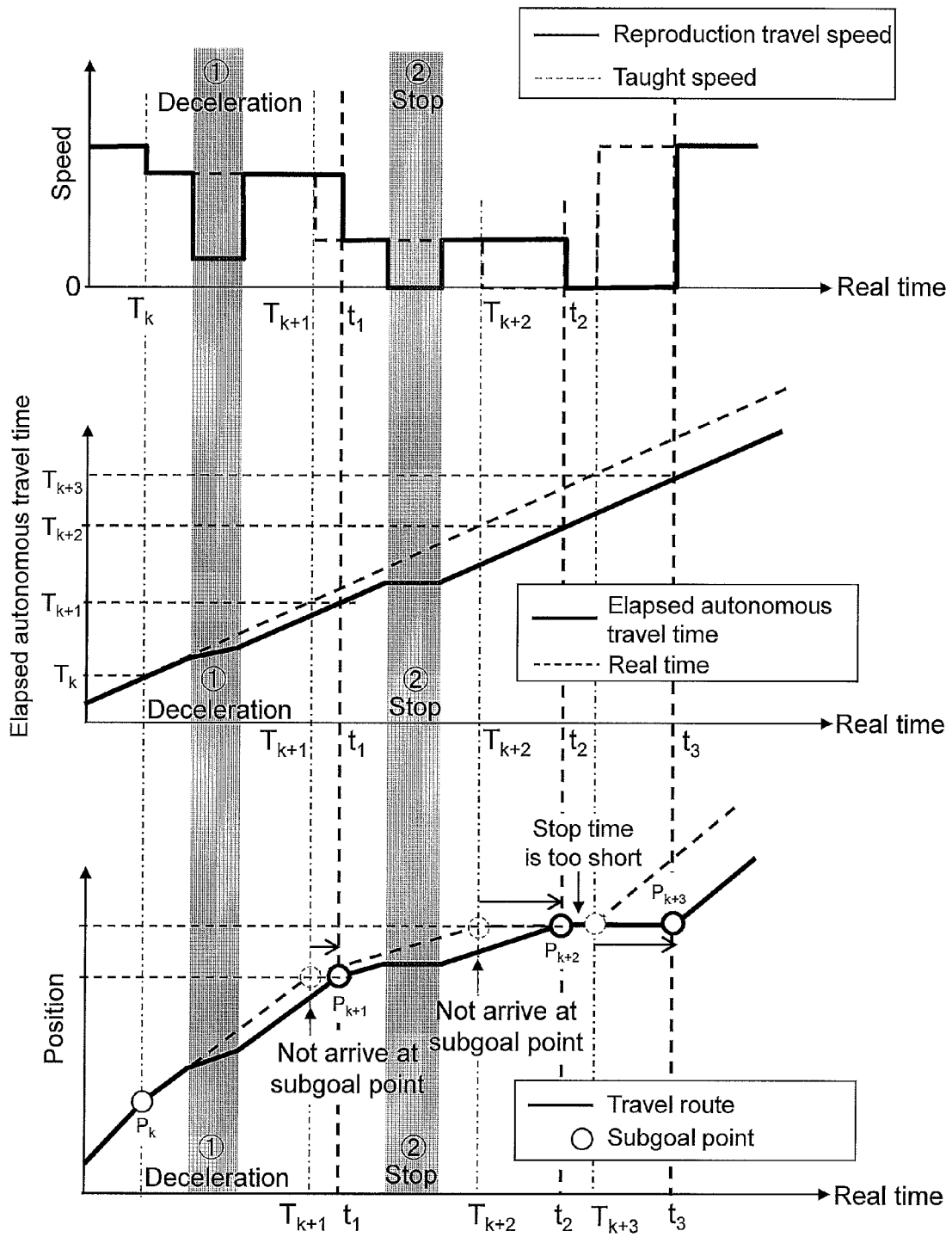
FIG. 9 is a diagram schematically illustrating an example of the reproduction travel.

When the autonomous travel vehicle 100 travels along the travel route indicated in the travel route data 500 illustrated in FIG. 8, it is supposed that, in the time range between the real time points $T_k$ and $T_{k+1}$ shown as the shaded portion in FIG. 9, a traveling obstacle or the like is detected and the autonomous travel vehicle 100 decelerates, and that, in the time range between the real time points $T_{k+1}$ and $T_{k+2}$ shown as the shaded portion in FIG. 9, a traveling obstacle or the like is detected and the autonomous travel vehicle 100 stops, as illustrated in FIG. 9. FIG. 9 is a diagram schematically illustrating an example of the reproduction travel.

Note that "real time" and "real time point" mean actual time and actual time point. On the other hand, the elapsed autonomous travel time is a virtual time that does not necessarily synchronize with the real time.

In this way, when the autonomous travel vehicle 100 decelerates or stops in the way that is not indicated in the travel route data 500 in executing the reproduction travel mode, at the real times $T_{k+1}$ and $T_{k+2}$ after the deceleration and/or the stopping as illustrated in FIG. 9, the autonomous travel vehicle 100 does not reach the subgoal points $P_{k+1}$ and $P_{k+2}$ that are associated with the arrival times $T_{k+1}$ and $T_{k+2}$ corresponding to these real time points.

On the other hand, at the real time point $T_{k+3}$, as illustrated in FIG. 9, the autonomous travel vehicle 100 has reached the subgoal point $P_{k+3}$ associated with the corresponding arrival time $T_{k+3}$. However, even in this case, it cannot be said that the autonomous travel vehicle 100 has traveled reliably along the travel route indicated in the travel route data 500 for the following reason.

The travel route data 500 indicates to stop in the period between the arrival times $T_{k+2}$ and $T_{k+3}$. Supposing that the autonomous travel vehicle 100 restarts traveling at $T_{k+3}$ as indicated in the travel route data 500, it stops in the period between a time point $t_2$, at which the autonomous travel vehicle 100 reaches the subgoal point $P_{k+3}$ (actually it has reached at $P_{k+2}$), and the real time point $T_{k+3}$.

However, as illustrated in FIG. 9, the stop time between the time points $t_2$ and $T_{k+3}$ is shorter than the stop time ($T_{k+3}$−$T_{k+2}$) indicated in the travel route data 500. In other words, during the reproduction travel, the autonomous travel vehicle 100 stops only during the time shorter than the taught stop time ($T_{k+3}$−$T_{k+2}$). In this case, the autonomous travel vehicle 100 cannot reliably reproduce the operation (acceleration, deceleration, or stopping) taught by the operator.

Accordingly, when unexpected deceleration, stop, or the like that is not indicated in the travel route data 500 occurs, the elapsed autonomous travel time counter 741 adjusts the progress speed of the elapsed autonomous travel time. In this preferred embodiment, by adjusting the unit elapsed time to be accumulated when the elapsed autonomous travel time is counted, the progress speed of the elapsed autonomous travel time is adjusted. Then, the reproduction travel command calculator 753 compares the elapsed autonomous travel time whose progress speed is adjusted with the arrival times in the travel route data 500, so as to determine the arrival target point.

In the graph of FIG. 9 illustrating a relationship between the elapsed autonomous travel time and the real time, a gradient of the graph of the elapsed autonomous travel time with respect to the real time point (the graph shown by a solid line) corresponds to the unit elapsed time (the progress speed of the elapsed autonomous travel time). Note that the graph of a dotted line in the graph showing a relationship between the elapsed autonomous travel time and the real time is a graph showing the progress of real time.

As illustrated in FIG. 9, in the deceleration section between the arrival times $T_k$ and $T_{k+1}$, the gradient of the graph showing a relationship between the real time and the elapsed autonomous travel time in the section is smaller than that of the graph of a dotted line (real time point=real time). In other words, the progress speed of the elapsed autonomous travel time is decreased.

Accordingly, at a real time point $t_1$ after the real time $T_{k+1}$, the elapsed autonomous travel time is the arrival time $T_{k+1}$ associated with the (k+1)th subgoal point $P_{k+1}$ in the travel route data 500. In addition, as illustrated in FIG. 9, the autonomous travel vehicle 100 reaches the subgoal point $P_{k+1}$ when the elapsed autonomous travel time becomes $T_{k+1}$ (real time point=$t_1$).

Further, when the elapsed autonomous travel time becomes $T_{k+1}$ (real time point=$t_1$), i.e., when the autonomous travel vehicle 100 reaches the subgoal point $P_{k+1}$, the reproduction travel command calculator 753 sets the next arrival target point to the subgoal point $P_{k+2}$. Then, the reproduction travel command calculator 753 calculates a reproduction travel command that causes the autonomous travel vehicle 100 to travel at the speed $v_{k+2}$ associated with the subgoal point $P_{k+2}$.

On the other hand, the unit elapsed time is set to zero in the stop section between the real time points $t_1$ and $T_{k+2}$. Accordingly, the graph showing a relationship between the real time and the elapsed autonomous travel time has a gradient of zero (i.e., horizontal). In other words, in the stop section, counting of the elapsed autonomous travel time is stopped. Then, after the autonomous travel vehicle 100 starts traveling, the progress speed of the elapsed autonomous travel time becomes the same as the progress speed of real time.

Accordingly, the elapsed autonomous travel time becomes $T_{k+2}$ at the real time point $t_2$ after the real time point $T_{k+2}$. In addition, as illustrated in FIG. 9, the autonomous travel vehicle 100 reaches the subgoal point $P_{k+2}$ when the elapsed autonomous travel time becomes $T_{k+2}$ (real time point=$t_2$).

Then, when reaching the subgoal point $P_{k+2}$ (when the elapsed autonomous travel time becomes $T_{k+2}$), the reproduction travel command calculator 753 sets the subgoal point $P_{k+3}$ to the next arrival target point. Then, the reproduction travel command calculator 753 calculates the reproduction travel control command that causes the autonomous travel vehicle 100 to travel at the speed $v_{k+3}$ associated with the subgoal point $P_{k+3}$ (or to stop in the travel route data 500 illustrated in FIG. 7).

Further, as illustrated in FIG. 9, since the progress speed of the elapsed autonomous travel time is the same as the progress speed of real time after the real time point $t_2$, the elapsed autonomous travel time becomes $T_{k+3}$ at a real time point $t_3$ ($=t_2+(T_{k+3}-T_{k+2})$) after the real time point $T_{k+3}$. Then, when the elapsed autonomous travel time becomes $T_{k+3}$, the reproduction travel command calculator 753 calculates the reproduction travel control command that causes the autonomous travel vehicle 100 to travel (again) at the speed $v_{k+4}$.

As a result, as illustrated in FIG. 9, the autonomous travel vehicle 100 stops during a period $T_{k+3}-T_{k+2}$ between the real time points $t_2$ and $t_3$. In other words, the autonomous travel vehicle 100 is able to stop at the taught position for the taught stop time during the reproduction travel.

In this way, when the autonomous travel vehicle 100 performs unexpected deceleration or stopping that is not indicated in the travel route data 500, the progress of the elapsed autonomous travel time is delayed, or counting (progress) of the elapsed autonomous travel time is stopped, and the reproduction travel command calculator 753 generates the reproduction travel control command based on the elapsed autonomous travel time. Thus, not only the travel route indicated in the travel route data 500 but also a time length to execute the operation such as stopping is reliably reproduced.

Figure 6C:
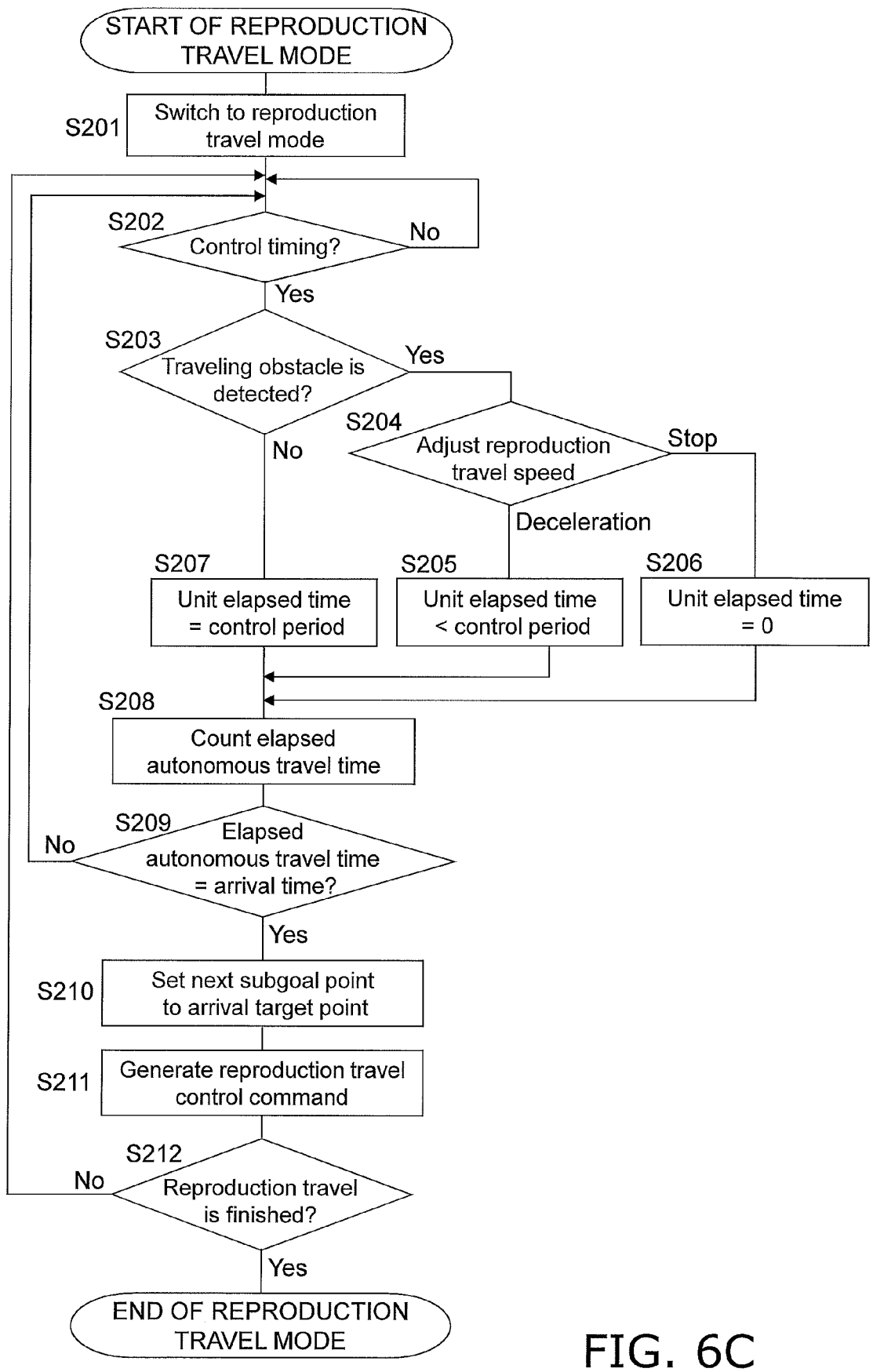
FIG. 6C is a flowchart illustrating a method of reproduction travel along a travel route.

Next, the reproduction travel method of the travel route in the autonomous travel vehicle 100 of this preferred embodiment is described with reference to FIG. 6C. FIG. 6C is a flowchart illustrating the reproduction travel method of the travel route.

When the reproduction travel of the travel route is started, the travel mode of the autonomous travel vehicle 100 is first set to the reproduction travel mode (Step S201). For example, when the operator operates the setting input interface 53 of the operation input interface, the travel mode is switched to the reproduction travel mode.

When the travel mode is switched to the reproduction travel mode by the setting input interface 53, the switch 77 of the controller 7 is informed that the travel mode has become the reproduction travel mode. Then, the switch 77 instructs the drive switch 751 of the motor driver 75 to connect the terminal e and the terminal f in the drive switch 751. In this way, the motor controller 755 is connected to the reproduction travel command calculator 753 in a manner capable of transmitting and receiving signals via the drive switch 751. As a result, the motor controller 755 is able to control the motors 23a and 23b based on the reproduction travel control command.

After switching the travel mode to the reproduction travel mode, counting of time that detects the control timing starts. The controller 7 checks whether or not the current time point is the control timing of the traveler 2 (the motors 23a and 23b) (Step S202). If the controller 7 determines that the current time point is not the control timing ("No" in Step S202), the process returns to Step S202.

On the other hand, if the controller 7 determines that the current time point is the control timing ("Yes" in Step S202), the process proceeds to Step S203.

In this way, in Step S202, the controller 7 checks whether or not the current time point is the control timing, and executes the succeeding process. Thus, the controller 7 is able to control the traveler 2 at each control timing. The control period of the motors 23a and 23b can be used, for example, as the control timing.

After determining in Step S202 that the current time point is the control timing, the obstacle information acquirer 76 first obtains information about an obstacle around the travel route based on a signal from the detector 3 (Step S203).

Then, based on information about a position of an obstacle obtained by the obstacle information acquirer 76, the reproduction travel speed adjuster 759 detects an obstacle (a traveling obstacle) that is supposed to be on the travel route and may hinder the travel, and/or a traveling obstacle or the like that is supposed to enter the travel route.

When the reproduction travel speed adjuster 759 detects one of the traveling obstacles or the like described above ("Yes" in Step S203), the process proceeds to Step S204. On the other hand, if the reproduction travel speed adjuster 759 does not detect the traveling obstacle or the like ("No" in Step S203), the process proceeds to Step S207.

If the reproduction travel speed adjuster 759 detects the traveling obstacle, the reproduction travel speed adjuster 759 adjusts the reproduction traveling speed that is a speed of the autonomous travel vehicle 100 when the reproduction travel mode is executed based on a relationship between a position of the traveling obstacle or the like and a current position of the autonomous travel vehicle 100 (Step S204).

When it is determined that the traveling obstacle or the like is in a vicinity of the autonomous travel vehicle 100 and it is highly possible that the traveling obstacle or the like collides with the autonomous travel vehicle 100, for example, the reproduction travel speed adjuster 759 instructs the motor controller 755 to stop the autonomous travel vehicle 100. In other words, the reproduction travel speed adjuster 759 instructs the motor controller 755 to stop rotations of the motors 23a and 23b.

On the other hand, if the traveling obstacle or the like is relatively far from the autonomous travel vehicle 100 and there is little possibility of the collision for a while, the reproduction travel speed adjuster 759 instructs the motor controller 755 to limit the traveling speed of the autonomous travel vehicle 100. In other words, the reproduction travel speed adjuster 759 instructs to limit the rotation speeds of the motors 23a and 23b. In this way, the reproduction travel speed adjuster 759 is able to limit the reproduction traveling speed of the autonomous travel vehicle 100.

When limiting the reproduction traveling speed, the reproduction travel speed adjuster 759 is able to instruct so as to limit the rotation speeds of the motors 23a and 23b by, for example, transmitting to the motor controller 755 a ratio to the maximum traveling speed of the autonomous travel vehicle 100 (corresponding to the (taught) speed of the autonomous travel vehicle 100 when the rotation amounts of the operation handles 51a and 51b are maximum during the manual operation teaching mode).

In this way, the motor controller 755 is able to calculate the specific limited rotation speeds of the motors 23a and 23b by simply calculating the product of the predetermined maximum traveling speed and the above-mentioned ratio.

When the reproduction travel speed adjuster 759 limits (decelerates) the reproduction traveling speed (in the case of "deceleration" in Step S204), the elapsed autonomous travel time counter 741 adjusts the length of the unit elapsed time to set the progress speed of the elapsed autonomous travel time (namely, the unit elapsed time) lower than the progress speed of real time (Step S205).

Specifically, the elapsed autonomous travel time counter 741 decreases the unit elapsed time to be shorter than a period of a signal that determines the control timing (the control period). Then, the elapsed autonomous travel time counter 741 accumulates the unit elapsed time having a value smaller than the control period, every control period as long as the reproduction traveling speed is limited.

For this purpose, the elapsed autonomous travel time counter 741 first compares the taught speed, which is associated with the subgoal point corresponding to a current position of the autonomous travel vehicle 100 and indicated in the travel route data 500, with the reproduction traveling speed limited by the reproduction travel speed adjuster 759.

Next, the elapsed autonomous travel time counter 741 calculates, for example, the product of a ratio of the adjusted reproduction traveling speed to the taught speed at the current position ((reproduction traveling speed)/(taught speed)) and a period of the signal that determines the control timing (the control period), as the unit elapsed time. In this way, it is possible to calculate the unit elapsed time having a smaller value than the control period.

On the other hand, when the reproduction travel speed adjuster 759 sets the reproduction traveling speed to zero, i.e., stops the autonomous travel vehicle 100 (in the case of "stop" in Step S204), the elapsed autonomous travel time counter 741 sets the unit elapsed time to zero (Step S206). In this way, the elapsed autonomous travel time counter 741 is able to stop counting the elapsed autonomous travel time. It is because, even if the unit elapsed time having zero value is accumulated to the elapsed autonomous travel time, the value of the elapsed autonomous travel time is not increased.

Alternatively, when the reproduction traveling speed becomes zero, the elapsed autonomous travel time counter 741 may stop counting the elapsed autonomous travel time by stopping accumulating the unit elapsed time. In this way, it is also possible to prevent the value of the elapsed autonomous travel time from increasing.

On the other hand, if a traveling obstacle is not detected in Step S203 ("No" in Step S203), the elapsed autonomous travel time counter 741 sets the length of the unit elapsed time to the same value as the period of the signal that determines the control timing (the control period) (Step S207).

After adjusting the unit elapsed time based on the predetermined condition (whether or not the traveling obstacle or the like is detected, and whether or not the reproduction traveling speed is adjusted) by executing Steps S205 to S207 as described above, the elapsed autonomous travel time counter 741 adds the adjusted unit elapsed time to the current elapsed autonomous travel time to count a new elapsed autonomous travel time (Step S208).

As described above, when the reproduction traveling speed is decreased to be lower than the taught speed, since the elapsed autonomous travel time counter 741 accumulates the unit elapsed time having a value smaller than the control period every control period to count the elapsed autonomous travel time, the progress speed of the elapsed autonomous travel time is able to be set to be lower than the progress speed of real time.

On the other hand, when the reproduction traveling speed is set to zero (namely, if the autonomous travel vehicle 100 stops), since the elapsed autonomous travel time counter 741 accumulates the unit elapsed time that is zero to count the elapsed autonomous travel time, the counting (progress) of the elapsed autonomous travel time is able to be stopped.

Further, when the reproduction traveling speed is the same as the taught speed (if an obstacle or the like is not detected), since the elapsed autonomous travel time counter 741 accumulates the unit elapsed time that is the same as the control period every control period to count the elapsed autonomous travel time, the progress speed of the elapsed autonomous travel time can be the same as the progress speed of real time.

After adding the adjusted unit elapsed time to the elapsed autonomous travel time to count the new elapsed autonomous travel time in Step S208, the reproduction travel command calculator 753 checks whether or not the newly counted elapsed autonomous travel time is a value corresponding to the arrival time indicated in the travel route data 500 (Step S209).

If the newly counted elapsed autonomous travel time is not the value corresponding to the arrival time indicated in the travel route data 500 ("No" in Step S209), for example, if the newly counted elapsed autonomous travel time is a time point between two arrival times, the process returns to Step S202. Then, Steps S202 to S208 are executed again.

On the other hand, if the newly counted elapsed autonomous travel time is the same or substantially the same as the value corresponding to the arrival time indicated in the travel route data 500 ("Yes" in Step S209), the reproduction travel command calculator 753 sets the subgoal point associated with the arrival time immediately after the arrival time corresponding to the newly counted elapsed autonomous travel time (the target arrival time) in the travel route data 500 as a new arrival target point (Step S210).

Specifically, if the arrival time corresponding to the newly counted elapsed autonomous travel time is the arrival time ($T_m$) in the m-th travel route data structure 500-$m$, for example, the reproduction travel command calculator 753 determines the target arrival time that is the arrival time immediately after the arrival time $T_m$. In this preferred embodiment, the reproduction travel command calculator 753 sets the arrival time $T_{m+1}$ stored in the travel route data structure 500-(m+1) following the m-th travel route data structure 500-m as the target arrival time. Then, the reproduction travel command calculator 753 sets the subgoal point $P_{m+1}$ ($x_{m+1}$, $y_{m+1}$) associated with the arrival time $T_{m+1}$ as a new arrival target point.

In this way, when the elapsed autonomous travel time becomes the time point corresponding to the arrival time indicated in the travel route data 500, the reproduction travel command calculator 753 is able to update the reproduction travel control command.

After the reproduction travel command calculator 753 determines the new arrival target point, the reproduction travel command calculator 753 generates the travel control command (the reproduction travel control command) that causes the autonomous travel vehicle to reach the new arrival target point (Step S211).

Specifically, in the example in which the subgoal point stored in the (m+1)th travel route data structure 500-(m+1) is set as the new arrival target point as described above, the reproduction travel command calculator 753 generates the travel control command that causes the autonomous travel vehicle 100 to travel at the taught speed $v_{m+1}$ stored in the travel route data structure 500-(m+1).

After the reproduction travel command calculator 753 generates the reproduction travel control command that causes autonomous travel vehicle 100 to travel at the speed $v_{m+1}$, the generated reproduction travel control command is transmitted to the motor controller 755 via the drive switch 751. As a result, the motor controller 755 is able to control the rotation speeds of the motors 23a and 23b to allow the autonomous travel vehicle 100 to travel at the speed $v_{m+1}$.

After the reproduction travel command calculator 753 outputs the reproduction travel control command, the reproduction travel command calculator 753 determines whether or not all travel routes indicated in the travel route data 500 have been passed (Step S212). For example, if an end of file (also referred to as "EOF") identifier of the travel route data 500 is detected when the reproduction travel command calculator 753 reads the next arrival target point, the reproduction travel command calculator 753 is able to determine that all travel routes indicated in all the travel route data 500 have been passed.

When the reproduction travel command calculator 753 determines that all travel routes have been passed ("Yes" in Step S212), the execution of the reproduction travel mode ends.

On the other hand, if the reproduction travel command calculator 753 determines that all travel routes have not been passed ("No" in Step S212), the process returns to Step S202, and the execution of the reproduction travel mode continues (namely, the reproduction travel continues).

In this way, the autonomous travel vehicle 100 reliably passes through the subgoal points on the travel route and also reliably reproduces time lengths of the operations by the operator such as acceleration, deceleration, stopping of the autonomous travel vehicle 100 (namely, the operations having a concept of time), so that the autonomous travel vehicle 100 executes the reproduction travel until the end of the travel route.

Other Preferred Embodiments

Although preferred embodiments of the present invention are described above, the present invention is not limited to the preferred embodiments described above but can be modified within the scope of the present invention without deviating from the spirit thereof. In particular, the plurality of preferred embodiments and variations described in this specification can be arbitrarily combined as necessary.

In the first preferred embodiment described above, the operator actually operates the autonomous travel vehicle 100, and the travel route along which the autonomous travel vehicle 100 passes by the operation by the operator is stored as the travel route data 500. However, the method of generating the travel route data 500 is not limited to the method described above. It is possible to generate the travel route data 500 without actually operating the autonomous travel vehicle 100.

For instance, the travel route data 500 can be generated by storing a plurality of predetermined passing points of the autonomous travel vehicle 100 on the movement plane as the (taught) subgoal points in the travel route data 500 (e.g., an electronic file for the travel route data 500), and associating predetermined time points at which the subgoal points are passed and predetermined traveling speeds at the subgoal points with the stored subgoal points to store them in the travel route data 500.

Alternatively, it is possible to modify the travel route data 500 generated based on the actual operation by the operator after the travel route data 500 is generated. In this way, even if the travel route data 500 contains a noise or a wrong operation by the operator is stored, it is possible to generate and store the travel route data 500 in which the noise is reduced, and/or the wrong operation is corrected.

Preferred embodiments of the present invention can be widely applied to autonomous travel vehicles that autonomously travel while reproducing a specified travel route.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomous travel vehicle comprising:
    a traveler that travels in accordance with a travel control command; and
    a controller that includes:
        a storage that stores travel route data, a plurality of subgoal points on a planned travel route and arrival times when the autonomous travel vehicle reaches each of the plurality of subgoal points respectively being stored in the storage in association with each other in the travel route data; and
        a processor configured or programmed to include:
            an elapsed autonomous travel time counter that counts an elapsed autonomous travel time that is an elapsed time from a start of a reproduction travel mode, while adjusting progress of the elapsed autonomous travel time based on a predetermined condition, when executing the reproduction travel mode in which the autonomous travel vehicle autonomously travels along the travel route based on the travel route data; and
            a reproduction travel command calculator that calculates a reproduction travel control command at the elapsed autonomous travel time as the travel control command when the reproduction travel mode is executed, based on a subgoal point in the travel route data in association with a target arrival time, which is an arrival time immediately after an arrival time corresponding to the elapsed autonomous travel time.

2. The autonomous travel vehicle according to claim 1, wherein the reproduction travel command calculator calculates the reproduction travel control command when the elapsed autonomous travel time reaches the arrival time in the travel route data.

3. The autonomous travel vehicle according to claim 1, further comprising:
a detector that detects a position of an obstacle that may hinder traveling of the traveler; and
a reproduction travel speed adjuster that adjusts a reproduction traveling speed of the traveler based on the position of the obstacle when the reproduction travel mode is executed; wherein
the elapsed autonomous travel time counter adjusts the progress of the elapsed autonomous travel time based on the reproduction traveling speed adjusted by the reproduction travel speed adjuster.

4. The autonomous travel vehicle according to claim 3, wherein when the reproduction travel speed adjuster sets the reproduction traveling speed to zero, the elapsed autonomous travel time counter stops counting the elapsed autonomous travel time.

5. The autonomous travel vehicle according to claim 3, wherein when the reproduction travel speed adjuster decreases the reproduction traveling speed, the elapsed autonomous travel time counter makes the progress of the elapsed autonomous travel time slower than a progress of real time.

6. The autonomous travel vehicle according to claim 1, wherein the travel route data includes data on the speed of the traveler at each of the plurality of subgoal points in association with each of the plurality of subgoal points.

7. The autonomous travel vehicle according to claim 1, wherein the processor is configured or programmed to further include:
an elapsed teaching time counter that counts an elapsed teaching time when a manual operation teaching mode is executed in which the travel route data is taught by an operation by an operator, the elapsed teaching time being a time from start of the manual operation teaching mode; and
a taught data generator that generates the travel route data including a taught subgoal point on the travel route passed by the operation by the operator and a taught elapsed time, when the taught subgoal point is obtained, stored in association with each other, when the manual operation teaching mode is executed.

8. The autonomous travel vehicle according to claim 7, wherein the taught data generator stores a taught speed in association with the taught subgoal point in the travel route data, the taught speed being a speed of the traveler at the taught subgoal point.

9. A reproduction travel method of an autonomous travel vehicle including a traveler that travels in accordance with a travel control command, and a controller that includes a processor and a storage that stores travel route data, a plurality of subgoal points on a planned travel route and arrival times when the autonomous travel vehicle reaches each of the subgoal points respectively being stored in the storage in association with each other in the travel route data, the reproduction travel method comprising the steps of:
counting an elapsed autonomous travel time that is an elapsed time from a start of a reproduction travel mode, while adjusting progress of the elapsed autonomous travel time based on a predetermined condition;
calculating a reproduction travel control command at the elapsed autonomous travel time as the travel control command, based on a subgoal point stored in the travel route data in association with a target arrival time, which is an arrival time immediately after an arrival time corresponding to the elapsed autonomous travel time; and
controlling the traveler based on the reproduction travel control command as the travel control command.

* * * * *